United States Patent [19]

Kamel et al.

[11] Patent Number: 6,023,291
[45] Date of Patent: Feb. 8, 2000

[54] SATELLITE CAMERA ATTITUDE DETERMINATION AND IMAGE NAVIGATION BY MEANS OF EARTH EDGE AND LANDMARK MEASUREMENT

[75] Inventors: Ahmed A Kamel, Los Altos; Kwok M Ong, Mountain View, both of Calif.

[73] Assignee: Space Systems/Loral, Inc., Palo Alto, Calif.

[21] Appl. No.: 08/939,616

[22] Filed: Sep. 29, 1997

Related U.S. Application Data

[60] Provisional application No. 60/028,872, Oct. 16, 1996.

[51] Int. Cl.[7] .................................................. H04N 7/18
[52] U.S. Cl. ......................... 348/147; 348/116; 348/117; 701/4; 701/13
[58] Field of Search ................................. 348/147, 116, 348/117; 701/4, 13; H04N 7/18

[56] References Cited

U.S. PATENT DOCUMENTS

| | | | |
|---|---|---|---|
| 3,715,594 | 2/1973 | Drohan et al. | 250/372 |
| 4,084,772 | 4/1978 | Muhlfelder | 244/165 |
| 4,489,383 | 12/1984 | Schmidt, Jr. | 364/434 |
| 4,521,855 | 6/1985 | Lehner et al. | 364/434 |
| 4,599,697 | 7/1986 | Chan et al. | 364/434 |
| 4,684,084 | 8/1987 | Fuldner et al. | 244/168 |
| 4,688,092 | 8/1987 | Kamel et al. | 348/147 |
| 4,710,619 | 12/1987 | Haberl | 250/206.3 |
| 4,725,024 | 2/1988 | Vorlicek | 244/164 |
| 4,746,976 | 5/1988 | Kamel et al. | 348/116 |
| 4,758,957 | 7/1988 | Hubert et al. | 364/434 |
| 4,759,517 | 7/1988 | Clark | 244/168 |
| 4,767,084 | 8/1988 | Chan et al. | 244/164 |
| 4,848,706 | 7/1989 | Garg et al. | 244/169 |
| 4,931,942 | 6/1990 | Garg et al. | 364/459 |
| 5,055,689 | 10/1991 | Proffit et al. | 250/349 |
| 5,104,217 | 4/1992 | Pleitner et al. | 356/2 |
| 5,109,346 | 4/1992 | Wertz | 364/459 |
| 5,184,790 | 2/1993 | Fowell | 244/165 |
| 5,189,295 | 2/1993 | Falbel | 250/206.2 |
| 5,204,818 | 4/1993 | Landecker | 348/116 |
| 5,222,023 | 6/1993 | Liu et al. | 364/434 |
| 5,349,532 | 9/1994 | Tilley et al. | 364/459 |
| 5,400,252 | 3/1995 | Kazimi et al. | 364/434 |
| 5,452,869 | 9/1995 | Basuthakur et al. | 244/164 |
| 5,459,669 | 10/1995 | Adsit et al. | 364/459 |
| 5,546,309 | 8/1996 | Johnson et al. | 701/13 |
| 5,647,015 | 7/1997 | Choate | 382/103 |
| 5,870,486 | 2/1999 | Choate | 701/4 |
| 5,899,945 | 5/1999 | Baylocq | 701/4 |

FOREIGN PATENT DOCUMENTS 0 499 815 A1  8/1992  European Pat. Off. .

OTHER PUBLICATIONS

"Quaternion Feedback for Spacecraft Large Angle Maneuvers", Bong Wie et al., J. Guidance, vol. 8 No. 3, May, Jun. 1985, pp. 360–365.

"Attitude Stabilization of Flexible Spacecraft During Stationkeeping Maneuvers", Bong Wie et al., J. Guidance, vol. 7, No. 4, pp. 430–436, Jul.–Aug. 1984.

Primary Examiner—Howard Britton
Attorney, Agent, or Firm—Perman & Green, LLP

[57] ABSTRACT

A method and system is disclosed for imaging a celestial object, typically the Earth, with a spacecraft orbiting the celestial object. The method includes steps of (a) operating an imager instrument aboard the spacecraft to generate data representing an image of the celestial object; (b) processing the image data to derive the location of at least one predetermined landmark in the image and a location of edges of the celestial object in the image; and (c) further processing the detected locations to obtain the attitude of the imager instrument. The method includes a further step of outputting the image and the imager instrument attitude to at least one end-user of the image, and/or using the imager instrument attitude to revise the image before outputting the image to the at least one end-user of the image. The generated data preferably represents a one half frame image, and the steps of processing and further processing thus occur at a one half frame rate. The step of processing includes a step of applying the a priori knowledge of the attitude coefficients in processing new observations to determine the imager current attitude.

30 Claims, 8 Drawing Sheets

CORRECTION TO Hs FROM NON-SPHERICAL TO SPHERICAL EARTH MODEL

CORRECTION TO Hd FROM NON-SPHERICAL TO SPHERICAL EARTH MODEL

ZOOMED-IN CORRECTION TO Hd FROM SPHERICAL TO NON-SPHERICAL EARTH MODEL

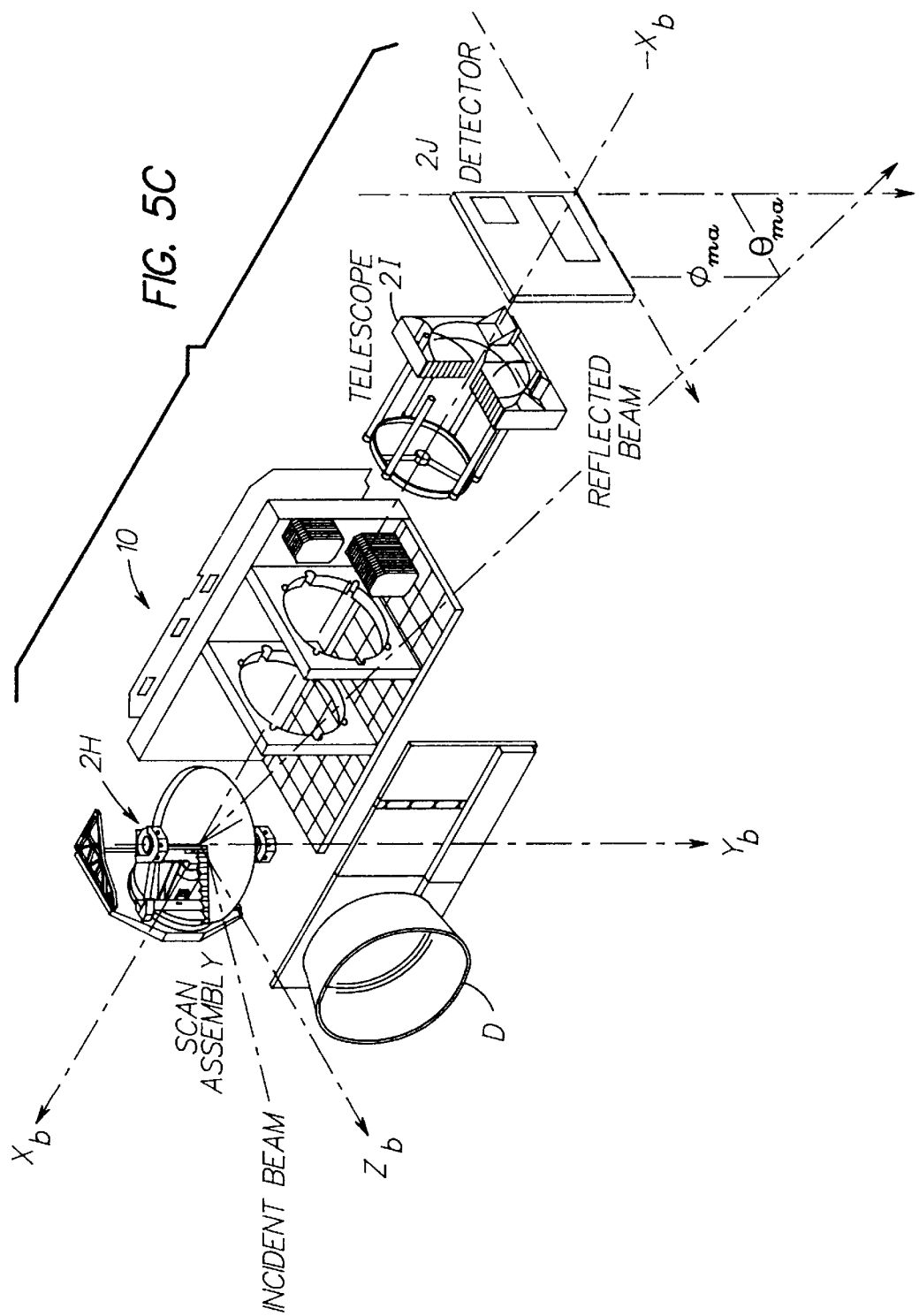

SATELLITE CAMERA ATTITUDE DETERMINATION AND IMAGE NAVIGATION BY MEANS OF EARTH EDGE AND LANDMARK MEASUREMENT

Priority is herewith claimed under 35 U.S.C. §119(e) from copending Provisional Patent Application 60/028,872, filed 10/16/96, entitled "Satellite Camera Attitude Determination and Image Navigation by Means of Earth Edge and Landmark Measurement", by A. A. Kamel and K. M. Ong. The disclosure of this Provisional Patent Application is incorporated by reference herein in its entirety.

FIELD OF THE INVENTION

This invention relates generally to satellite imaging techniques and, in particular, to satellite imager attitude determination and image navigation using an output of an on-board imaging system.

BACKGROUND OF THE INVENTION

It is well known in the art to provide certain types of spacecraft with imaging systems. Three axes stabilized geosynchronous orbit meteorological satellites are exemplary of this type of spacecraft. The imaging system can include a CCD camera or other type of imager that provides rows of pixels that make up an image frame.

It is also known that pixels within a satellite camera image can be precisely located in terms of latitude and longitude on a celestial body, such as the earth, that is being imaged. By example, U.S. Pat. No.: 4,688,092, "Satellite Camera Image Navigation", by A. A. Kamel et al. teaches that a ground-based computer generates models of a satellite's orbit and attitude. The orbit model is generated from measurements of stars and landmarks taken by satellite cameras, and by range data taken by a tracking station. The attitude model is based on star measurements taken by the cameras. The measured data is then fit to the models using a walking least squares fit algorithm, and pixel coordinates are then transformed into earth latitude and longitude coordinates, using the orbit and attitude models. Reference may also be had to U.S. Pat. No. 4,746,976, entitled "Star Sightings by Satellite for Image Navigation", by A. A. Kamel et al.

Also of interest is U.S. Pat. No.: 3,715,594, entitled "Space Vehicle System for Determining Earth's Ultraviolet Radiation Limb", by W. A. Drohan et al., wherein a sensor having a radioactive reference graticule is used to detect the earth's ultraviolet (UV) radiation limb. The detected UV radiation limb is employed as an earth-space boundary reference to derive position information for use in a space vehicle navigation control system.

OBJECTS OF THE INVENTION:

It is a first object of this invention to provide an improved earth imaging system that does not require that images of other celestial objects, such as stars, be acquired.

It is a further object of this invention to provide a satellite imaging system that employs an image of the earth's edge to supplement images of landmarks for obtaining the attitude of the imaging system.

SUMMARY OF THE INVENTION

The objects of the invention are realized by methods and apparatus in accordance with embodiments of this invention, wherein a method and system is disclosed for imaging a celestial object, typically the Earth, with a spacecraft orbiting the celestial object. The method includes steps of (a) operating an imager instrument aboard the spacecraft to generate data representing an image of the celestial object; (b) processing the image data to the pixel location of at least one predetermined landmark in the image and pixel location of the edges of the celestial object, in at least two scan lines corresponding to two latitudes in the image; and (c) further processing the detected locations to obtain the attitude of the imager instrument. Preferred latitudes are those that yield the most sensitivity, such as about 45 degrees North latitude and about 45 degrees South latitude.

The method includes a further step of outputting the image and the imager instrument attitude to at least one end-user of the image, and/or using the imager instrument attitude to revise the image before outputting the image to the at least one end-user of the image.

The generated data preferably represents a one half frame image, and the steps of processing and further processing thus occur at a one half frame rate. The step of processing includes a step of inputting nominal imager instrument landmark scan angles, and further includes a step of applying the a priori knowledge of the attitude coefficients in processing new observations to determine the imager current attitude.

The step of processing the image data to derive a location of edges of the celestial object in the image operates in accordance with a spherical Earth model, and further includes a step of applying correction terms to accommodate a non-spherical Earth model.

The step of processing the image data to derive a location of edges of the celestial object in the image includes an initial step of obtaining Earth edge observables by measuring imager instrument line-of-sight (LOS) scan angles during an East-West scan when the LOS enters and exits the Earth's horizon.

In a preferred embodiment the Earth edge observables are combined to form half-sum and half-difference pseudo observables, wherein the half-sum pseudo-observable ($H_s$) can be interpreted as an E/W coordinate of a mid-point of a line joining two measured Earth edges corresponding to a given North-South imager instrument scan line, and wherein the half-difference pseudo-observable ($H_d$) can be interpreted as a deviation of a half-chord length of the line joining the two measured Earth edges from a nominal value.

It is shown that the $H_s$ is approximately comprised of a negative pitch angle $-\theta$ weighted by a geometric factor cos N, and an East-West misalignment compensation term $\delta E_{ma}$ at a corresponding North-South scan angle, and wherein $H_d$ is approximately comprised of roll and a North-South misalignment term, which is a function of roll misalignment and pitch misalignment, weighted by a geometric factor depending on both the East-West and North-South scan angles. Both landmark and Earth edge measurements are fitted to an observational model to determine attitude coefficients using a least squares procedure.

In a preferred embodiment the step of fitting includes steps of, for each half-frame of image data, correcting observed East-West and North-South scan angles in accordance with a non-spherical Earth model, using current orbit and attitude knowledge, to provide modified observations; and fitting the modified observations to a spherical Earth-based mathematical model using a sequential batch filter. The parameters that are solved are Fourier and polynomial coefficients of five attitude angles which are defined as three angles representing the attitude state of the spacecraft characterized by Euler angles roll ($\phi$), pitch ($\theta$), and yaw ($\psi$), and the attitude state of the imager instrument, relative to the spacecraft body, described by a misalignment of the imager instrument optical axis with respect to the spacecraft body axes, expressed as two angles representing roll misalignment ($\phi_m$) and pitch misalignment ($\theta_{ma}$).

In a preferred embodiment of this invention a priori knowledge of all the coefficients are used to determine, for the case where no special event occurs immediately before the image, the current attitude solution and its full covariance matrix. The a priori knowledge of only the Fourier coefficients are used for the case where a special event does occur before the image.

BRIEF DESCRIPTION OF THE DRAWINGS

The above set forth and other features of the invention are made more apparent in the ensuing Detailed Description of the Invention when read in conjunction with the attached Drawings, wherein:

FIG. 5C is an elevational, exploded view of the imager payload that includes the imager scan assembly of FIG. 5B, and which further shows spacecraft and imager axes.

DETAILED DESCRIPTION OF THE INVENTION

Figure 1:
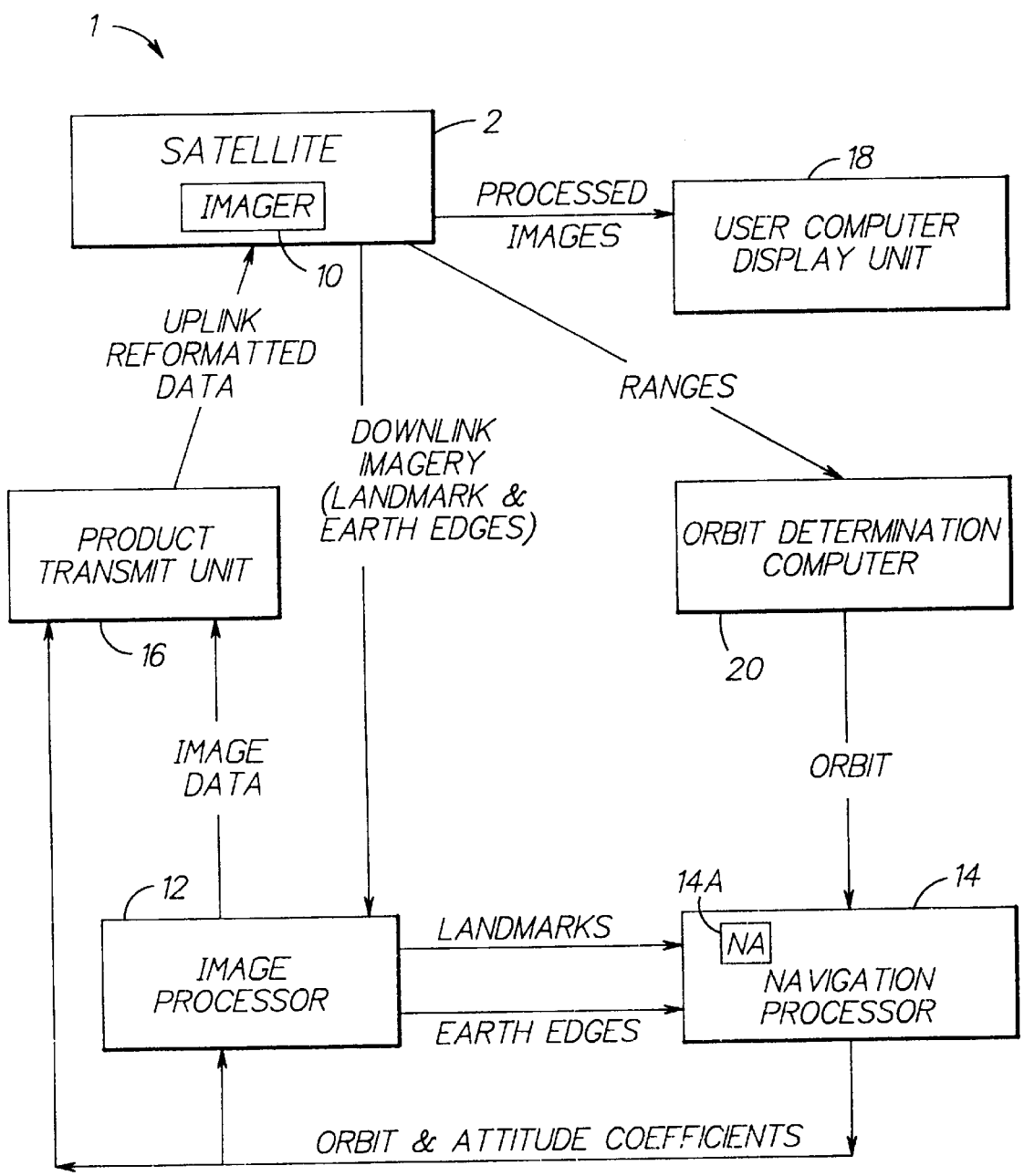
FIG. 1 is a block diagram of an Image Navigation (IN) system in accordance with this invention, the IN system including a spacecraft-based Imager and a Navigation Processor that executes a Navigation Algorithm that implements a method of this invention.

The following provides the mathematical foundation of a presently preferred Navigation Algorithm for a 3-axis stabilized, geosynchronous imaging satellite 2 shown in FIG. 1. An Image Navigation (IN) System 1 provides a methodology whereby a time varying spacecraft attitude can be navigated in near-real-time by ground-based processing of the digital imagery returned by an on board radiometer or imager instrument 10. The imager 10 may include a CCD-based camera, or any suitable imaging device capable of producing picture elements or pixels that represent an image. The pixels can be output from the camera in a row by row or scan-line format.

In accordance with an aspect of this invention, no star measurements are needed. Instead, measurements of the Earth's edges in the imagery are used to supplement images of landmarks.

Downlinked digital imagery is first reduced by a ground subsystem (Image Processor 12) to yield pixel coordinates (instrument scan angles) of recognizable landmarks, as well as selected Earth edges. These pixel coordinates comprise the observables that are inputted to a Navigation Algorithm 14A of a Navigation Processor 14 for determining the attitude of the imager instrument 10. The attitude solution thus obtained, along with the imagery, can either be transmitted to end-user computers 18 by way of a Product Transmit Unit 16, via the satellite, or fed back to the Image Processor 12 for pixel corrections to yield improved imagery before transmission to the end-user computers 18.

Figure 5A:
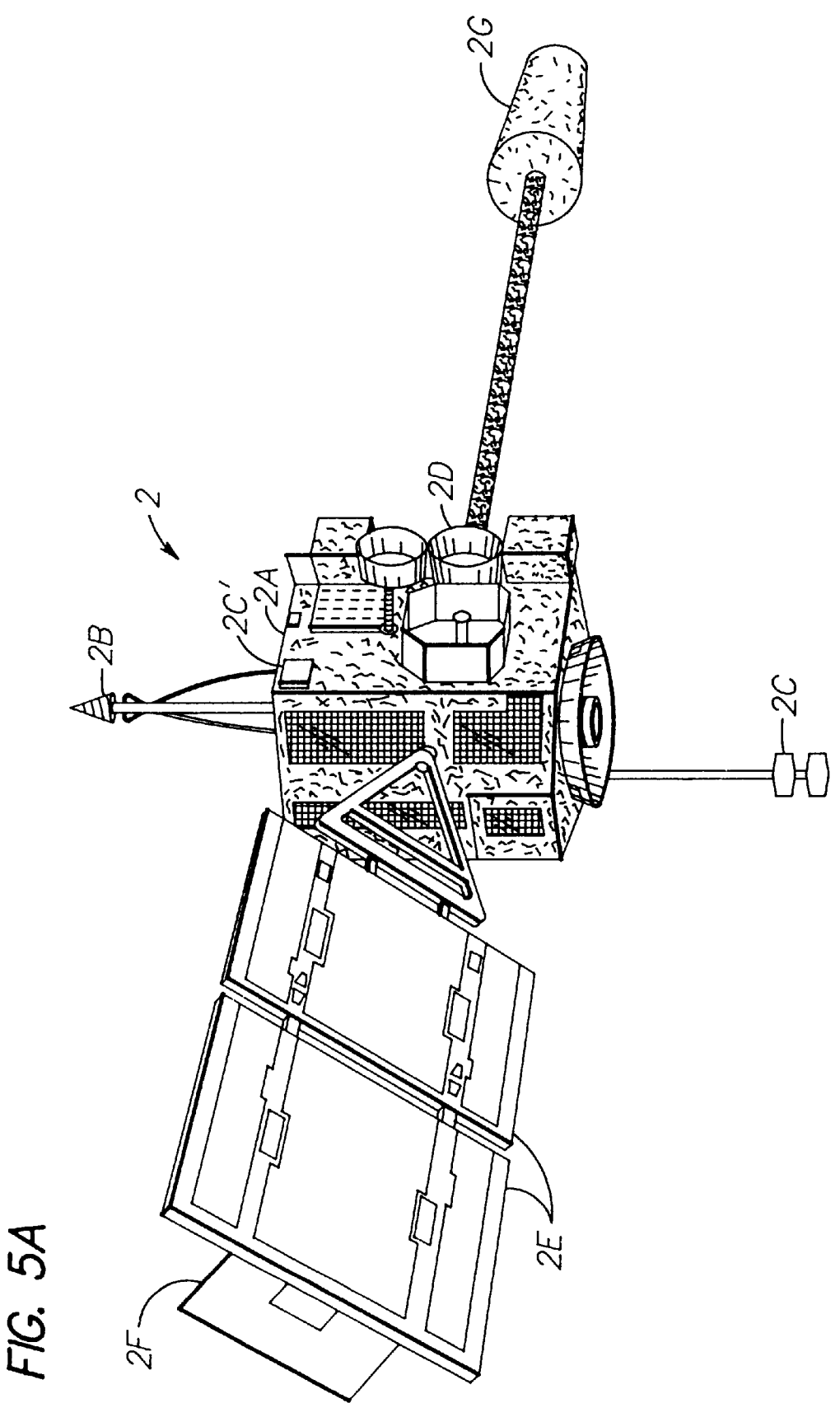
FIG. 5A is an elevational view of a spacecraft that is suitable for practicing this invention.
Figure 5B:
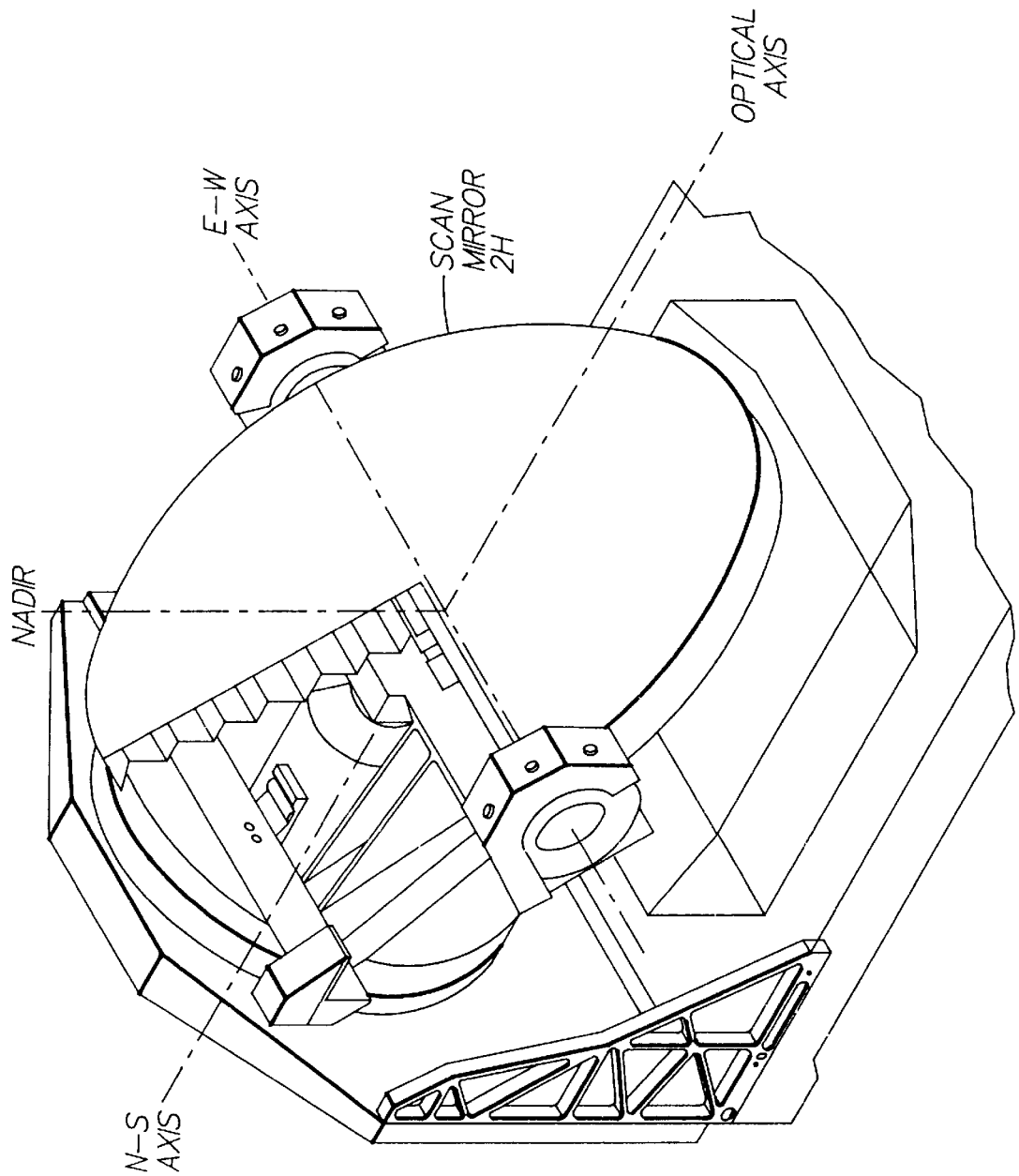
FIG. 5B is an elevational view of an imager scan assembly that forms a portion of the payload of the spacecraft of FIG. 5A.
Figure 5D:
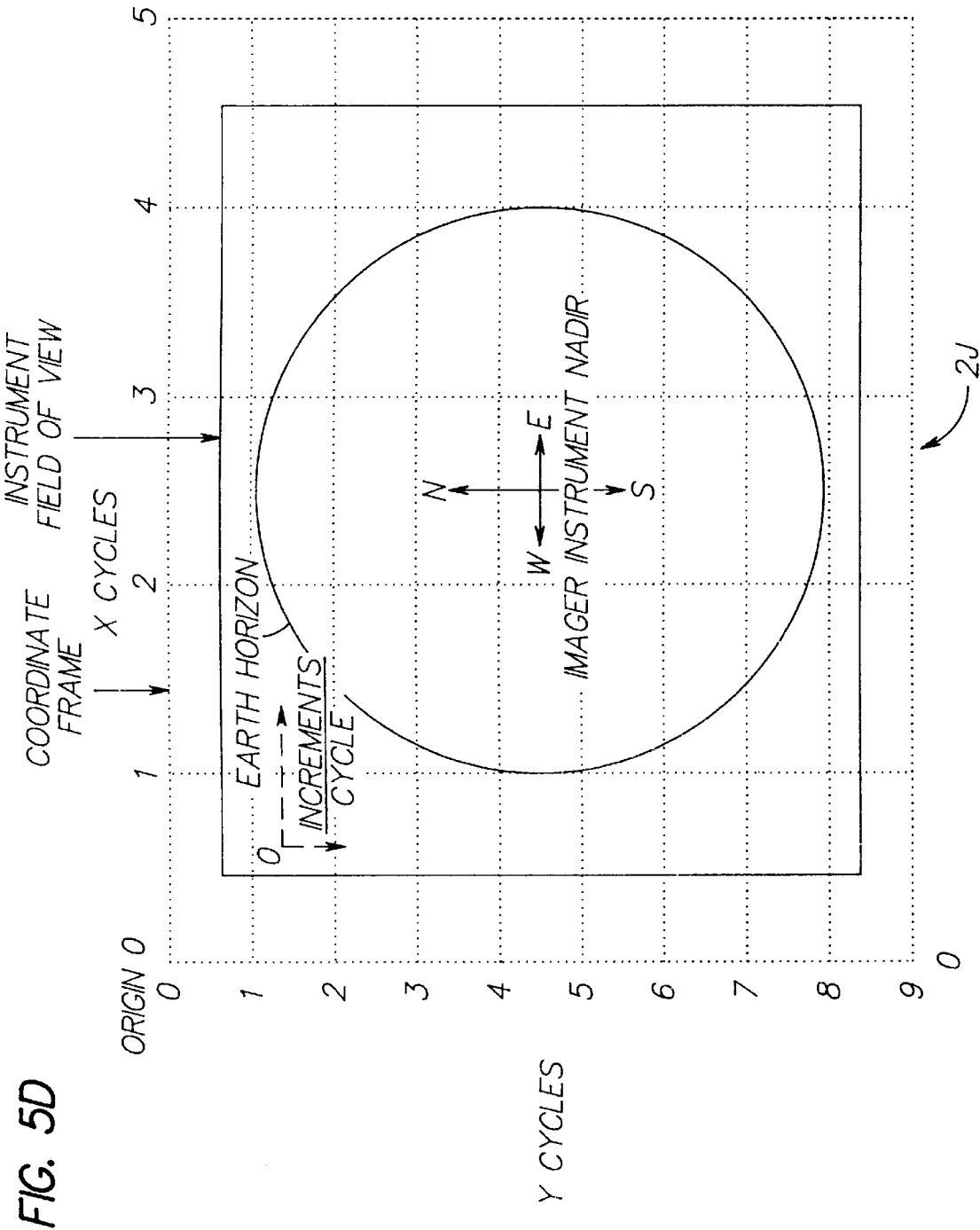
FIG. 5D illustrates the imager coordinate frame of the imager shown in FIG. 5C.

Reference is made to FIGS. 5A–5D for showing an exemplary embodiment of the spacecraft 2 in greater detail. The spacecraft 2 includes a bus 2A from which protrudes a telemetry and control (T&C) antenna 2B, a magnetometer 2C, an Earth sensor 2C', and an entrance aperture 2D of the imager 10 payload. Also attached to the bus 2A are solar panels 2E, which support a trim tab 2F, and a solar sail 2G. FIG. 5B shows a portion of the imager 10 payload, in particular a scan mirror 2H and its associated components. FIG. 5C illustrates the imager 10 payload in greater detail, and depicts an orientation of the scan mirror assembly and scan mirror 2H to the optical aperture 2D, as well as to a telescope 21 and a multi-pixel image detector 2J. The various spacecraft and imager axes are also shown. FIG. 5D illustrates the coordinate frame of the image detector 2J, and shows an exemplary image of the Earth overlaid on the detector.

It is assumed that the spacecraft orbital state, having been independently determined by an Orbit Determination Function 20 elsewhere in the ground system, is known to a sufficient accuracy at all times during the observation span. It can be shown that orbit errors not exceeding 300 m will cause navigation errors of less than 1.5 Arad. For this reason, orbital elements and dynamical parameters (such as radiation pressure constants, thrust parameters, etc.) are not estimated by the Navigation Algorithm 14A: only the spacecraft attitude state (roll, pitch, and yaw) and two parameters specifying the misalignment of the optical axis of the imager 10, with respect to the spacecraft body axes, are estimated.

One important feature of the Navigation Algorithm 14A is the use of real-time Earth edge data in place of star sighting data to complement landmark observations. Both landmark and Earth edge data types are treated as observables in the attitude estimation process. The Earth edge observable is a novel approach to providing the imager attitude estimation, and a comprehensive theory of its use is described herein.

Another important feature of the Navigation Algorithm 14A is its ability to perform ground-based image-by-image navigation in near real time. In a baseline design, the imager attitude is determined, and the returned imagery is corrected every half-frame, wherein a half-frame is defined to be a hemispherical Earth scan of about 15 minutes duration. This process insures that attitude is rapidly determined, and that improved imagery is delivered to the users in a timely fashion.

Attitude Determination

Because the daily attitude profiles change very slowly, it is possible to process successive frames of imagery via the technique of a priori processing, or sequential batch least squares filtering. The imagery is first reduced by the Image Processor 12 to yield time-tagged information of the imager instrument 10 line-of-sight (LOS) East-West and North-South scan angles.

The inputs to the Navigation Algorithm 14A are the landmark and Earth edge scan angles. The desired output is the attitude of the imager instrument 10. However, the attitude angles themselves are not preferred as the solve-for parameters of the estimation process. This is because the attitude angles tend to vary extensively during the data collection and processing span. Therefore, each attitude angle is preferably modeled as a function of time with a set of constant coefficients. The constant coefficients then become the solve-for parameters of the estimation process. Once these parameters have been determined, the attitude can be re-constructed from the model time function.

Attitude Modeling

The combined attitude of the on-board imager instrument 10 and the spacecraft 2 is characterized by the Euler angles roll ($\phi$), pitch ($\theta$), and yaw ($\psi$). The attitude state of the on-board imager instrument 10, relative to the spacecraft body 2A, is further described by the misalignment of its optical axis with respect to the spacecraft body axes. Hence, two additional angles, roll misalignment ($\phi_m$) and pitch misalignment ($\theta_m$) are introduced to describe this effect. The attitude state of the imager instrument 10 is thus defined by five angles.

The spacecraft body and the imager instrument 10 mounting structure are subject to-diurnal thermal distortion caused by the sun. In addition, the spacecraft attitude is also subject to nonrepeatable effects caused by Earth sensor radiance gradient, clouds, and geomagnetic field variations. Thus, the spacecraft roll, pitch, and yaw will have both repeatable and nonrepeatable components and are modeled as a combination of Fourier and polynomial terms. The misalignment angles, on the other hand, are believed to be affected only by the daily thermal effect and are modelled by Fourier terms only. These five angles, collectively referred to as the attitude state vector $\vec{\beta} = (\phi, \theta, \psi, \phi ma, \theta ma)$ can therefore be represented as a time series as follows:

$$\beta^i = \sum_{n=1}^{n_f} [c_n^i \cos n\omega t + s_n^i \sin n\omega t] + \sum_{j=0}^{n_p} a_j^i (\omega t)^j \qquad (1)$$

with the understanding that the polynomial coefficients for misalignment angles are zero. In the above equation, $\beta^i$, $i = 1, \ldots, 5$ is the ith attitude angle, $n_f$ and $n_p$ are the maximum orders of the Fourier and polynomial terms, $c_n^i$, $s_n^i$ are the cosine and sine coefficients, $a_j^i$ are the polynomial coefficients, and o is the daily solar rate.

The Fourier and polynomial coefficients can be used as the solve-for parameters of the attitude determination estimation process. Furthermore, because the Sun angle changes very slowly from day to day, the attitude coefficients can be treated as a priori parameters in the estimation process.

Observation Modeling

The Navigation Algorithm 14A executed by the Navigation Processor 14 processes scan angle data available through image processing of the downlink digital signals returned by the spacecraft 2. Two data types are considered: i.e., a Landmark Data Type and an Earth Edge Data Type.

Both data types manifest themselves as the E/W and N/S scan angles of the Imager 10. Despite their apparent similarities, there are subtle differences between these two data types. These differences are due to the fact that landmarks can be uniquely identified, whereas Earth edges can be recognized only in "outline form." Because the Earth's outline is very nearly circular, edge measurements are insensitive to rotations about the yaw axis.

Figure 2A:
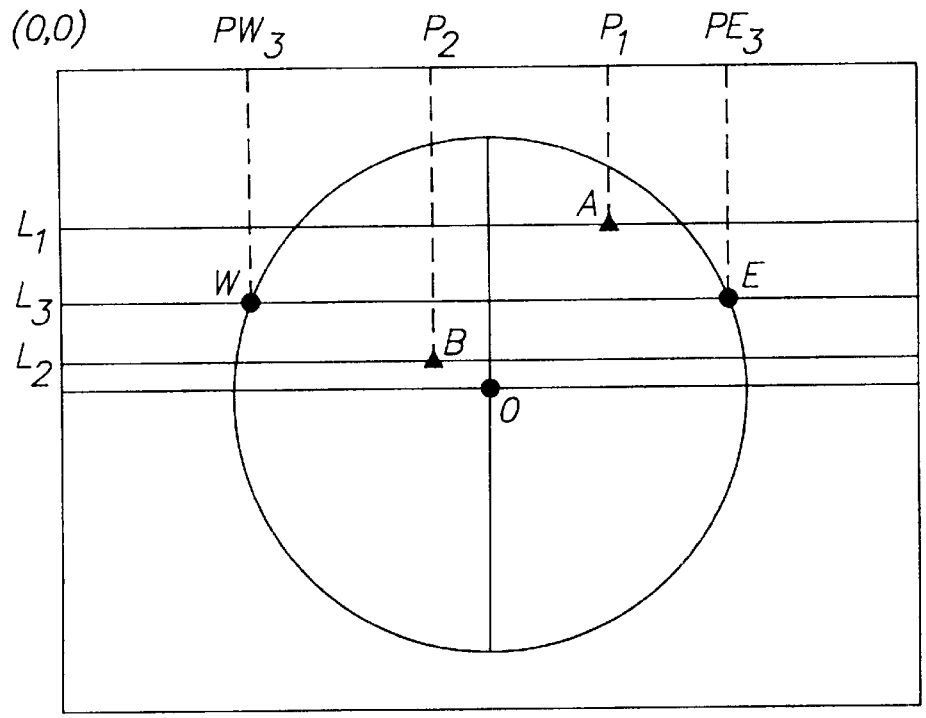
FIG. 2A is an exemplary imager field of view of the Earth's disk with no attitude error.

FIG. 2A shows the ideal Imager field-of-view with no attitude errors. Here, the Earth's disk is perfectly centered. Points A and B are representative landmarks. Let the scan coordinates corresponding to these landmarks be designated as (L1, P1) and (L2, P2). Let it be assumed that Earth edge measurements are carried out at line L3 with the East and West edge coordinates being (L3, PE3) and (L3, PW3), respectively, and let E and W be the physical points on the Earth's surface associated with these coordinates.

Figure 2B:
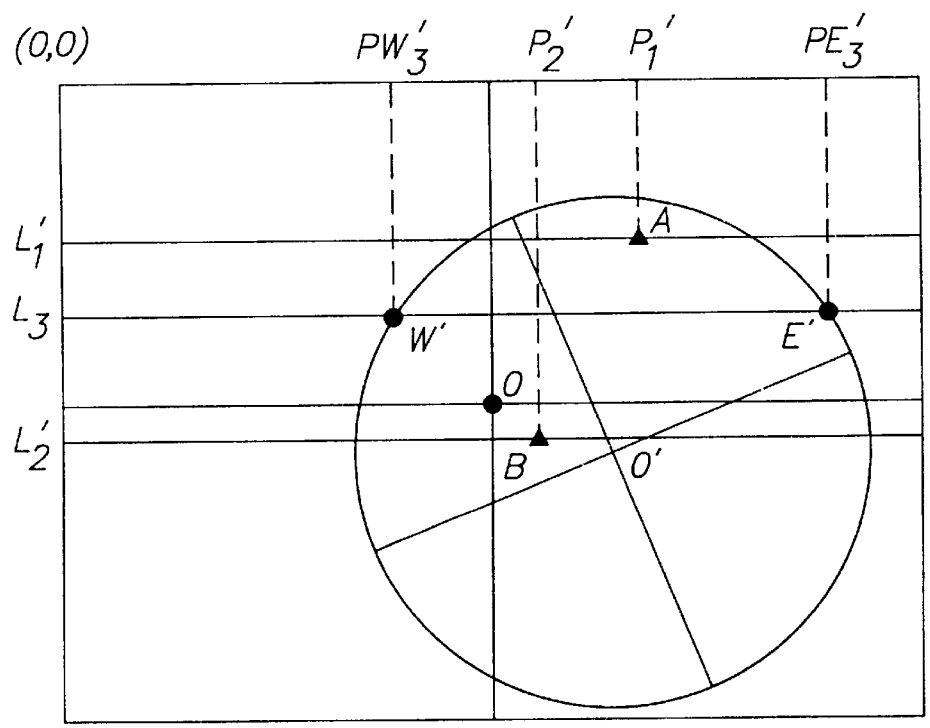
FIG. 2B is an exemplary imager field of view of the Earth's disk with attitude errors.

FIG. 2B is an exaggerated Imager FOV in the presence of attitude errors. It can be seen that the Earth center has been offset and its apparent spin axis has been rotated with respect to the absolute (line, pixel) reference system. Landmarks A and B are now observed at scan coordinates (L1', P1') and (L2', P2') that are different from the ideal scan coordinates. However, there is no way to follow the movement of the original edge points E and W since they are not identifiable, or they may have disappeared to the other side of the Earth. Instead, the Earth edge observation, carried out for the same line number L3, will have different contact points. The new edge coordinates can be designated as (L3, PE3') and (L3, PW3').

The Landmark Observable

A data base of landmark locations with known geographic coordinates to very high accuracy is assumed to be given. Since the spacecraft ephemeris is also assumed to be known at any time, the nominal line-of-sight vector from the spacecraft 2 to the landmark can be predicted. The deviations of the observed line-of-sight scan angles from their predicted values is a sensitive function of attitude, and thus constitutes the primary observables for the Navigation Algorithm 14A.

Each landmark is identified by its geographic coordinates: longitude ($\lambda$), geodetic latitude ($\phi_g$) and height (H) above a reference ellipsoid model (taken to be the World Geodetic System-84, or WGS-84, for the Earth). Hence, its position vector, $\vec{L} = (L_x, L_y, L_z)$, can be predicted accurately at any time via the following equations:

$$L_x = \left[ \frac{r_e}{\sqrt{1 - e^2 \sin \phi_g}} + H \right] \cos\phi_g \cos(\theta_g + \lambda) \qquad (2)$$

$$L_y = \left[ \frac{r_e}{\sqrt{1 - e^2 \sin^2 \phi_g}} + H \right] \cos\phi_g \sin(\theta_g + \lambda) \qquad (3)$$

$$L_z = \left[ \frac{r_e(1 - e^2)}{\sqrt{1 - e^2 \sin^2 \phi_g}} \right] \sin\phi_g \qquad (4)$$

where, $\theta_g$ is the Greenwich Sidereal time, $r_e$ is the Earth's equatorial radius, and e is Earth's ellipticity.

Let $\vec{r}$ be the instantaneous radius vector of the spacecraft 2 at the time of observation. The LOS unit vector A pointing from the spacecraft 2 to the landmark of interest is therefore given by:

$$\hat{s} = \frac{\vec{L} - \vec{r}}{|\vec{L} - \vec{r}|} \qquad (5)$$

The mathematical model for the landmark scan angles is summarized below:

$$E = \sin^{-1}(\hat{s} \cdot \hat{x}_b) + \delta E_{ms} \qquad (6)$$

$$N = \tan^{-1}(-\hat{s} \cdot \hat{y}_b / \hat{s} \cdot \hat{z}_b) + \delta N_{ma} \qquad (7)$$

where E is the East/West scan angle and N the North/South scan angle of the imager instrument 10 when pointing to the landmark, ŝ is the line-of-sight unit vector from the spacecraft 2 to the landmark, $\hat{x}_b, \hat{y}_b, \hat{z}_b$ are the unit vectors of the Spacecraft Body Coordinate System, and $\delta E_{ma}$, $\delta N_{ma}$ are corrections to the respective scan angles due to the misalignment effect and are given by the following expressions:

$$\delta E_{ma} = -\phi_{ma} \sin N - \theta_{ma} \cos N \quad (8)$$

$$\delta N_{ma} = (-\phi_{ma} \cos N + \theta_{ma} \sin N)/\cos E \quad (9)$$

The components of the line-of-sight unit vector in the Body frame are related to the components in the Orbital frame by the Euler rotation matrix $M_E$:

$$\hat{s}_b = M_E \hat{s}_s \quad (10)$$

where $$\hat{s}_b = (\hat{s} \cdot \hat{x}_b, \hat{s} \cdot \hat{y}_b, \hat{s} \cdot \hat{z}_b) \quad (11)$$

$$\hat{s}_s = (\hat{s} \cdot \hat{x}_s, \hat{s} \cdot \hat{y}_s, \hat{s} \cdot \hat{z}_s) \quad (12)$$

The Euler matrix can be thought of as the product of three successive elementary rotations about each of the roll, pitch, and yaw axes. The order of the elementary rotations is arbitrary, and the inventors have adopted the "11-2-3" order; i.e., first a rotation by $\phi$ about the x-direction, followed by a rotation by $\theta$ about the new (body) y-direction, and finally followed by a rotation by $\psi$ about the new z-direction. With this ordering of elementary rotations, the Euler Matrix takes the following form:

$$M_E = \begin{pmatrix} C_\theta C_\psi & S_\phi S_\theta C_\psi + S_\psi C_\phi & -C_\phi S_\theta C_\psi + S_\psi S_\phi \\ -C_\theta S_\psi & -S_\phi S_\theta S_\psi + C_\psi C_\phi & C_\phi S_\theta S_\psi + C_\psi S_\phi \\ S_\theta & -S_\phi C_\theta & C_\phi C_\theta \end{pmatrix} \quad (13)$$

The unit vectors in the Orbital frame are given in terms of the spacecraft 2 position and velocity vector:

$$\hat{z}_s = -\vec{r}/r \quad (14)$$

$$\hat{y}_s = -\frac{\vec{r} \times \vec{v}}{|\vec{r} \times \vec{v}|} \quad (15)$$

$$\hat{x}_s = \hat{y}_s \times \hat{z}_s \quad (16)$$

The elements of the Euler matrix $M_E$ are denoted by $m_{ij}$, and its three row vectors by $m_1$, $m_2$, $m_3$. Note that the entire spacecraft attitude dependency of the scan angle observables is contained in the matrix elements of $M_E$; i.e., the components of the unit vectors $m_i$. The misalignment dependency is contained in the terms $\delta E_m$ and $\delta N_{ma}$ in Eqs. (6) and (7).

The Earth Edge Observable—Spherical Earth Model

In accordance with an aspect of this invention, the Earth edge observables are obtained by measuring the imager instrument 10 line-of-sight scan angles during an E/W scan when the line-of-sight enters and exits the Earth's horizon. In this section, the Earth edge observable is developed with the assumption that the Earth is a perfect sphere. Corrections to this model, due to the oblateness of the Earth, are considered in the next section.

With the spherical Earth assumption, the condition that the point (E, N) in scan angle space lies on the edge of the Earth is tantamount to the constancy of the instantaneous maximum central angle (the angle between the LOS and the line joining the spacecraft position and the center of the Earth); i.e., $$\hat{x}_s \cdot \hat{s} = \cos \alpha_m$$

The quantity $\alpha_m$ is dependent on the position of the spacecraft 2 and is given by $$\sin \alpha_m = \frac{R_e}{R_s} \quad (18)$$

where $R_e$ is the Earth's equatorial radius, and $R_s$ is the instantaneous radial distance from the geocenter to the spacecraft 2. Note that $R_s$ is dependent on the orbit of the spacecraft 2.

Equations (6) and (7), plus the fact that the sum of squares of the components of a unit vector in any reference frame should add up to 1, allows one to write the following equations:

$$\hat{x}_b \cdot \hat{s} = \sin(E - \delta E_{ma}) \quad (19)$$

$$\hat{y}_b \cdot \hat{s} = -\cos(E - \delta E_{ma}) \sin(N - \delta N_{ma}) \quad (20)$$

$$\hat{z}_b \cdot \hat{s} = \cos(E - \delta E_{ma}) \cos(N - \delta N_{ma}) \quad (21)$$

Using the relationship between the two unit vectors $\hat{s}_s$ and $\hat{s}_b$, the Earth edge condition, Eq.(17) can be rewritten as follows:

$$m_{33} \cos \xi \cos N' - m_{23} \cos \xi \sin N' + m_{13} \sin \xi = \cos \alpha_m \quad (22)$$

where we have defined $$E' = E - \epsilon E_{ma} \quad (23)$$

$$N' = N - \delta N_{ms} \quad (24)$$

Equation (21) can further be rewritten $$(m_{33} C_{N'} - m_{23} S_{N'}) \cos E' + m_{13} \sin E' = \cos \alpha m \quad (25)$$

We now define auxiliary quantities D, $\alpha$ and $\gamma$ by the following equations $$\cos \zeta = \frac{m_{33} C_{N'} - m_{23} S_{N'}}{D} \quad (26)$$

$$\sin \zeta = \frac{m_{13}}{D} \quad (27)$$

$$D = \sqrt{(m_{33} C_{N'} - m_{23} S_{N'})^2 + m_{13}^2} \quad (28)$$

$$\cos \gamma = \frac{\cos \alpha_m}{D} \quad (29)$$

Note that $\zeta$ can be determined from the following equation:

$$\zeta = \tan^{-1} \left[ \frac{m_{13}}{m_{33} C_{N'} - m_{23} S_{N'}} \right] \quad (30)$$

The above definitions, when combined with Eq. (25), give $$\cos E' \cos \xi + \sin E' \sin \xi = \cos \gamma \quad (31)$$

or $$\cos(E' - \xi) = \cos \gamma \quad (32)$$

which leads to the solution $$E' - \xi = \pm \gamma \quad (33)$$

where the plus or minus sign corresponds to the east or west edge respectively.

The east edge, $E_e$, and west edge, $E_w$, can now be obtained by substituting Eq. (23) into Eq. (33) yielding:

$$E_e = \delta E_{ma} + \xi + \gamma \tag{34}$$

$$E_w = \delta E_{ma} + \xi - \gamma \tag{35}$$

The edge observables can be combined to form the "half-sum" $H_s$ and the "half-difference" $H_d$ pseudo observables as follows:

$$H_s = (E_c + E_w)/2 = \delta E_{ma} + \xi \tag{36}$$

$$H_d = (E_c - E_w)/2 - E_0 = \gamma - E_0 \tag{37}$$

where $$E_0 = \cos^{-1}\left[\frac{\cos\alpha_m}{\cos N}\right] \tag{38}$$

is the ideal east edge scan angle for the given N/S scan angle.

Physically, the half-sum pseudo-observable $H_s$ can be interpreted as the E/W coordinate of the mid-point of the line joining the two measured Earth edges corresponding to a given N/S scan line. The half-difference pseudo-observable $H_d$ may be interpreted as the deviation of the half-chord length of the line joining the two Earth edges from the nominal value.

The significance of these pseudo observables can be made clear by expanding their mathematical model to first order in attitude angles, and the following equations can be obtained:

$$H_s = \delta E_{ma} - \theta/C_N \tag{39}$$

$$H_d = \frac{\tan N}{\tan E}(\delta N_{ma} - \phi) \tag{40}$$

The two pseudo-observables are simpler to use than the "raw" edge observables. The only drawback to their use is that in forming the sum and difference of the raw measurements, the error estimates must also be root-sum-squared. However, the factor of one-half helps to bring the errors back to the same level as the raw measurements.

The half-sum pseudo-observable $H_s$ can be interpreted as the E/W coordinate of the midpoint of the line joining the two measured Earth edges corresponding to a given N/S scan line. As seen by examining Eq. (39), $H_s$ is made up of the negative pitch angle $-\theta$ and the E/W misalignment compensation term $\delta E_{ma}$ at the corresponding N/S scan angle. One conclusion that can be drawn from this observation is as follows: in the absence of optical axis misalignment, the deviation of the center-point of the line joining the Earth edges from zero would be due entirely to pitch and independent of scan angles. Thus, a single measurement of Earth edges could in principle determine the pitch.

The half-difference pseudo-observable $H_d$ may be interpreted as a deviation of the half-chord-length of the line joining the two Earth edges for the same scan line from its nominal value due to attitude. As can be seen by examining Eq.(40), it is made up mainly of roll and the N/S misalignment term (which is itself a function of roll misalignment and pitch misalignment). However, unlike the half-sum pseudo-observable, it is scan angle dependent. In the absence of misalignment, a single measurement of $H_d$ could determine roll by comparing the measured value to the nominal value.

In practice, optical axis misalignment cannot be ignored. Therefore the foregoing technique for determining roll and pitch does not lead to accurate results. A simultaneous solution of roll, pitch, roll misalignment, and pitch misalignment is preferably performed on multiple Earth edge observations at different N/S scan angles in order to obtain a good fix on the instantaneous attitude.

The Earth Edge Observable—Non-spherical Earth Model

The equations developed for the Earth edge observables given in the previous section are based on the assumption that the Earth's surface is a perfect sphere. Since the actual shape of the Earth is more closely approximated by an oblate spheroid than a perfect sphere, the actual Earth edge outline in scan angle space is different from what the spherical Earth model predicts. It is the purpose of this section to generalize the Earth edge formulation so that the Earth's nonsphericity effect an be corrected by the Navigation Algorithm 14A.

Formulation of the Earth Edge Equation in Inertial Space

Let the Earth's equatorial radium be a and its polar radius be b. The equation describing the Earth's surface, in the geocentric-equatorial (also known as the ECI or Earth-Centered Inertial) coordinate system of reference can be written as $$\frac{x^2}{a^2} + \frac{y^2}{a^2} + \frac{z^2}{b^2} = 1 \tag{41}$$

We are interested in the outline of the Earth's edge in scan angle space, as viewed from the vantage point of the spacecraft 2 that is instantaneously located at the position $(x_0, y_0, z_0)$.

The Earth's edge in physical 3-dimensional space may be defined to be the locus of the point (x, y, z) on the Earth's surface such that the line joining the spacecraft's instantaneous position to this point (the line-of-sight or LOS vector) would be tangential to the Earth's surface. The equations defining this tangent line can be written as follows:

$$x - x_0 = k\alpha \tag{42}$$

$$y - y_0 = k\beta \tag{43}$$

$$z - z_0 = k\gamma \tag{44}$$

where $\alpha$, $\beta$, $\gamma$ are the direction cosines of the LOS and k is the magnitude of the LOS vector.

To simplify the notation, the following quantities and constants are defined:

$$\begin{aligned} \xi &= x/a & \eta_0 &= y_0/a \\ \eta &= y/a & \zeta_0 &= z_0/b \\ \zeta &= z/b & \kappa &= k/a \\ \xi_0 &= x_0/a & g &= a/b \end{aligned} \tag{45}$$

Note that Eq.(41) implies $$\xi^2 + \eta^2 + \zeta^2 = 1 \tag{46}$$

Equations (41) through (44), expressed in terms of the new variables (45), can be reduced to an equation in $\kappa$:

$$A\kappa^2 + 2B\kappa + C = 0 \tag{47}$$

where $$A = \alpha^2 + \beta^2 + g^2\gamma^2 \tag{48}$$

$$B = \xi_0\alpha + \eta_0\beta + g\xi_0\gamma \tag{49}$$

$$C = \xi_0^2 + \eta_0^2 + \zeta_0^2 - 1 \tag{50}$$

Hence, at the edge of the Earth, the LOS should be barely touching (tangential to) the Earth's surface. The two roots of Eq. (47) should therefore collapse into one, meaning that its discriminant must vanish; i.e., $$\text{Disc} = B^2 - AC = 0 \tag{51}$$

which leads to an equation defining the Earth's edge in terms of the LOS direction cosines $\alpha$, $\beta$, $\gamma$. Expanding Eq. (51) by substituting Eqs. (48)–(50) into it, we obtain $$q1\alpha^2 + q2\beta^2 + q3\delta^2 + 2q4\beta\gamma + 2q5\alpha\gamma + 2q6\alpha\beta = 0 \tag{52}$$

where $$q_1 = 1 - \eta_0^2 - \zeta_0^2 \qquad q_4 = g\eta_0\zeta_0 \tag{53}$$
$$q_2 = 1 - \xi_0^2 - \zeta_0^2 \qquad q_5 = g\xi_0\zeta_0$$
$$q_3 = g^2(1 - \xi_0^2 - \eta_0^2 - \zeta_0^2) \qquad q_6 = \xi_0\eta_0$$

Relationship between Inertial Direction Cosines and Scan Angles

We will now relate the LOS direction cosines to scan angles. Since scan angles are most conveniently expressed in the Spacecraft Body Coordinate System, the transformations from the ECI to the Body reference are used. The LOS unit vector in the ECI frame is $$\hat{s} = \begin{pmatrix} \alpha \\ \beta \\ \gamma \end{pmatrix} \tag{54}$$

It can be shown that the LOS can be represented in the Body frame by $$\hat{s}_b = \begin{pmatrix} \sin E' \\ -\cos E' \sin N' \\ \cos E' \cos N' \end{pmatrix} \tag{55}$$

where $$E' = E - \delta E_{ma} \tag{56}$$

$$N' = N - \delta N_{ma} \tag{57}$$

and where E and N are the E/W and N/S scan angles; $\delta E_{ma}$, $\delta N_{ma}$, are scan angle deviations due to the optical axis misalignment of the Imager instrument 10. The misalignment effect can be characterized by two parameters $\phi_{ma}$, $\phi_{ma}$ with the resulting scan angle deviations given by the following expressions:

$$\delta E_{ma} = -\phi_{ma}\sin N - \theta_{ma}\cos N \delta N_{ma} = (-\phi_{ma}\cos N + \theta_{ma}\sin N)/\cos E \tag{58}$$

Transformation from the Inertial frame to the Body frame is effected by means of the intermediate reference frame called the Orbital Coordinate System (or Orbit frame) whose axes are commonly referred to as the roll, pitch and yaw axes. The unit vectors of the Orbit frame, $(\hat{x}_s, \hat{y}_s, \hat{z}_s)$ are given in terms of the spacecraft position and velocity vectors $\vec{r}$, $\vec{w}$ as follows:

$$\hat{z}_s = -\vec{r}/|\vec{r}| \hat{y}_s = -(\vec{r} \cdot \vec{w})/(\vec{r} \times \vec{v}) \hat{x}_s = \hat{y}_{si} \times \hat{z}_s \tag{59}$$

Thus, the components of a vector in the orbit frame can be obtained from the components of the same vector in the ECI frame by the rotation matrix:

$$\hat{s}_s = M_H \hat{s} \tag{60}$$

where $$M_H = \begin{pmatrix} x_{s1} & x_{s2} & x_{s3} \\ y_{s1} & y_{s2} & y_{s3} \\ z_{s1} & z_{s2} & z_{s3} \end{pmatrix} \tag{61}$$

is referred to as the Hill matrix, and where $x_{si}$, $y_{si}$, are the ith ECI (Earth-Centered Inertial) component of $\hat{x}_{si}$, $\hat{y}_{si}$, $\hat{z}_{si}$, with i=1, 2, 3.

On the other hand, the components of a vector in the Orbit frame are related to the components of the same vector in the Body frame by the Euler rotation matrix $M_E$:

$$\hat{s}_b = M_E \hat{s}_s \tag{62}$$

where $$\hat{s}_s = \begin{pmatrix} \hat{s} \cdot \hat{x}_s \\ \hat{s} \cdot \hat{y}_s \\ \hat{s} \cdot \hat{z}_s \end{pmatrix} \tag{63}$$

and the Euler matrix, which takes on different forms depending on the order of rotation about the respective axes, can be represented in the 1-2-3 order by $$M_E = \begin{pmatrix} C_\theta C_\psi & S_\phi S_\theta C_\psi + S_\psi C_\phi & -C_\phi S_\theta C_\psi + S_\psi S_\phi \\ -C_\theta S_\psi & -S_\phi S_\theta S_\psi + C_\psi C_\phi & C_\phi S_\theta S_\psi + C_\psi S_\phi \\ S_\theta & -S_\phi C_\theta & C_\phi C_\theta \end{pmatrix} \tag{64}$$

where $\phi$, $\theta$, $\psi$ are the roll, pitch, and yaw attitude angles. It can be shown that the order of rotations is not important for roll, pitch, and yaw of the order of a few hundred microradians.

We can now relate the direction cosines in the ECI frame to the Body frame via the following equation:

$$\hat{s}_b = M_E \hat{s}_s = M_E M_H \hat{s} \tag{65}$$

The matrix product $M_E M_H$ is itself a rotation matrix and is commonly known as the Euler-Hill matrix and denoted by $M_{EH}$. For notational simplicity, we shall drop the subscript EH and simply denote the Euler-Hill matrix by M:

$$M \equiv M_{EH} = M_E M_H \tag{66}$$

Inverting the above matrix equation, noting that we get $$\hat{s} = M^T \hat{s}_b \tag{67}$$

In terms of components, this can be written $$\begin{pmatrix} \alpha \\ \beta \\ \gamma \end{pmatrix} = M^T \begin{pmatrix} \sin E' \\ -\cos E' \sin N' \\ \cos E' \cos N' \end{pmatrix} \quad (68)$$

Thus, analytic expressions have been obtained for the inertial direction cosines $\alpha$, $\beta$, $\gamma$ in terms of the spacecraft orbit and attitude state vector (position and velocity components in matrix $M_H$ and attitude angles in the components of matrix $M_E$), scan angles E, N, and the misalignment parameters $\phi_{ma}$, $\theta_{ma}$ (contained implicitly in expressions for E', N').

The Earth Edge Equation in Scan Angle space

If the expressions for the inertial direction cosines in terms of scan angles are substituted into Eq. (53), an equation defining the Earth edge in scan angle space is obtained. Specifically, we wish to compute the E/W scan angles on the Earth's edge given values of the N/S scan angle. To see how this is done, we first rewrite the expressions for $\alpha$, $\beta$, $\gamma$ as given by Eq.(68) above as follows:

$$\alpha = M_{11} \sin E' + \mu_{11} \cos E' \quad \beta = M_{12} \sin E' + \mu_{12} \cos E' \quad \gamma = M_{13} \sin E' + \mu_{13} \cos E' \quad (69)$$

where $M_{ij}$ are the elements of matrix M, and $$\mu_{11} = -M_{21} \sin N' + M_{31} \cos N' \quad \mu_{12} = -M_{22} \sin N' + M_{32} \cos N' \quad \mu_{13} = -M_{23} \sin N' + M_{33} \cos N' \quad (70)$$

We note that the gijls are independent of $E^1$. Next, we observe that the left-hand side of Eq.(52) is a quadratic form in $\alpha$, $\beta\gamma$, and by substituting in Eqs.(69), can be rewritten into the following form:

$$F_1 \sin^2 E' + 2F_2 \sin E' \cos E' + F_3 \cos^2 E' = 0 \quad (71)$$

where $$F_1 = q_1 M_{11}^2 + q_2 M_{12}^2 + q_3 M_{13}^2 + 2q_4 M_{12} M_{13} + 2q_5 M_{13} M_{11} + 2q_6 M_{11} M_{12}$$

$$F_2 = q_1 M_{11}\mu_{11} + q_2 M_{12}\mu_{12} + q_3 M_{13}\mu_{13} + q_4(M_{12}\mu_{13} + M_{13}\mu_{12}) + q_5(M_{13}\mu_{11} + M_{11}\mu_{13}) + q_6(M_{11}\mu_{12} + M_{12}\mu_{11})$$

$$F_3 = q_1 \mu_{11}^2 + q_2 \mu_{12}^2 + q_3 \mu_{13}^2 + 2q_4 \mu_{12}\mu_{13} + 2q_5 \mu_{13}\mu_{11} + 2q_6 \mu_{11}\mu_{12} \quad (72)$$

Furthermore, by using the following trigonometric identities, $$\cos 2E' = 2\cos^2 E' - 1$$

$$\sin 2E' = 2\sin E' \cos E'$$

Equation (71) can now be rewritten as follows:

$$F_2 \sin 2E' + \frac{F_3 - F_1}{2} \cos 2E' = -\frac{F_3 + F_1}{2} \quad (73)$$

This equation can be solved for E' via the following technique. Defining the angles $\delta$ and $\epsilon$ by the following equations:

$$\sin 2\delta = \frac{F_2}{\sqrt{F_2^2 + (F_3 - F_1)^2/4}} \quad (74)$$

$$\cos 2\delta = \frac{1}{2} \frac{F_3 - F_1}{\sqrt{F_2^2 + (F_3 - F_1)^2/4}} \quad (75)$$

$$\cos 2\epsilon = -\frac{1}{2} \frac{F_3 + F_1}{\sqrt{F_2^2 + (F_3 - F_1)^2/4}} \quad (76)$$

then $$\sin 2\delta \sin 2E' + \cos 2\delta \cos 2E' = \cos 2\epsilon \quad (77)$$

leading to the solution $$E' = \delta \pm \epsilon \quad (78)$$

where the plus sign corresponds to the east edge and the minus sign the west edge. Note that the quantities $\delta$, $\epsilon$ can be obtained from:

$$\delta = \frac{1}{2} \tan^{-1} \frac{2F_2}{F_3 - F_1} \quad (79)$$

$$\epsilon = \frac{1}{2} \cos^{-1} \frac{|F_3 + F_1|}{\sqrt{F_2^2 + (F_3 - F_1)^2/4}} \quad (80)$$

The actual east and west Earth edges, $E_c$, $E_w$, in the presence of misalignment, are therefore given by:

$$E_c = \delta E_{ma} + \delta + \epsilon \quad (81)$$

$$E_w = \delta E_{ma} + \delta - \epsilon \quad (82)$$

The pseudo-observables $H_s$, $H_d$ are then computed via $$H_s = (E_c + E_w)/2 = \delta E_{ma} + \delta \quad (83)$$

$$H_d = (E_c - E_w)/2 - E_0 = \epsilon - E_0 \quad (84)$$

where $E_0$ is the ideal east edge scan angle in the spherical Earth model, given by Eq.(75).

Equations (81)–(84) can be compared with Eqs.(34)–(37) developed for the spherical Earth model. It can be seen that they are similarly structured, with the quantities $\delta$, $\epsilon$ corresponding to $\xi$, $\gamma$ of the spherical Earth model.

The Correction Terms from Non-spherical to Spherical Models

The equations for calculating the Earth edge scan angles for arbitrary spacecraft 2 orbit and attitude in the non-spherical Earth model are considerably more complicated than the corresponding equations in the spherical model. This implies that if the Navigation Algorithm 14A were based solely on the non-spherical Earth model, a much more complicated set of equations for the computation of the partial derivatives would be required. On the other hand, if the Navigation Algorithm 14A is based on the spherical Earth model, it will be necessary to correct for the observable errors due to Earth's nonsphericity. The latter approach is the simpler one and is thus preferred, as it involves less complicated partial derivatives calculations.

The correction terms can be computed using the equations developed for both the spherical and the non-spherical Earth models. In terms of the pseudo-observables $H_s$, $H_d$ defined previously, the correction terms are defined as follows:

$$\Delta H_s = H_s^{sph} - H_s^{naph} \quad (85)$$

$$\Delta H_d = H_d^{sph} - H_d^{naph} \quad (86)$$

Where the superscripts "sph" and "nsph" denote "spherical" and "non-spherical" respectively. The spherical pseudo-observables are to be calculated for arbitrary orbit and attitude by means of Eqs. (36) and (37), whereas the non-spherical counterparts are obtained with the help of Eqs. (83) and (84).

The "actual" pseudo-observables, i.e., pseudo-observables derived from the Earth edge imagery, are then transformed into "actual spherical pseudo-observables" as follows:

$$H_s^{act.sph} = H_s^{act} + \Delta H_s \qquad (87)$$

$$H_d^{act.sph} = H_d^{act} + \Delta H_d \qquad (88)$$

These transformed pseudo-observables can then be processed by means of the estimation algorithm based on the spherical Earth model.

Figure 3A:
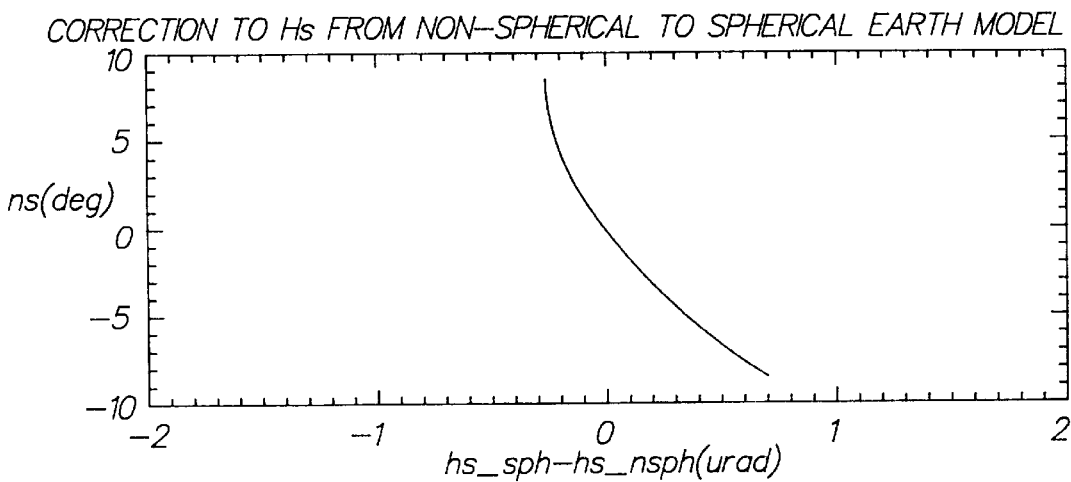
FIGS. 3A–3C are graphs that illustrate correction terms for Earth edge pseudo-observables for various N/S Imager scan angles.
Figure 3B:
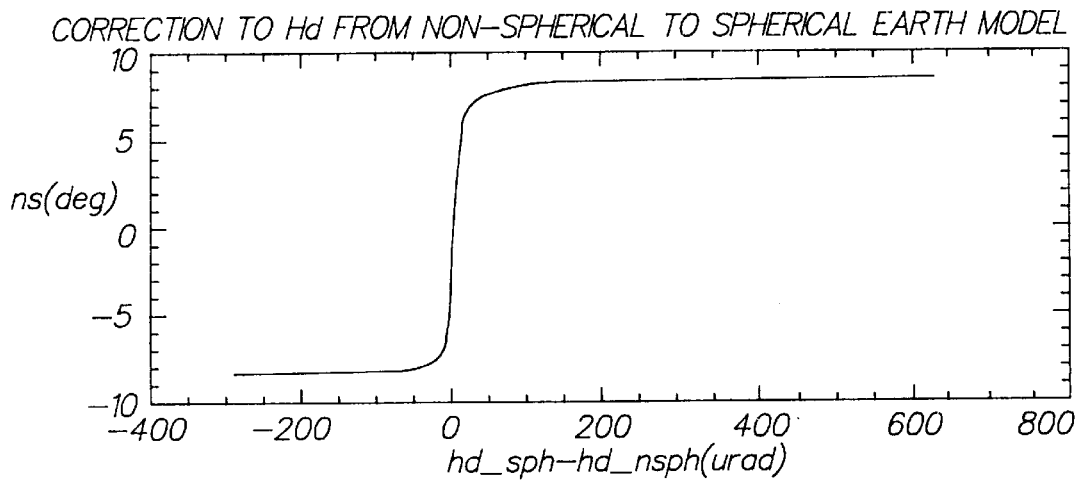
Figure 3C:
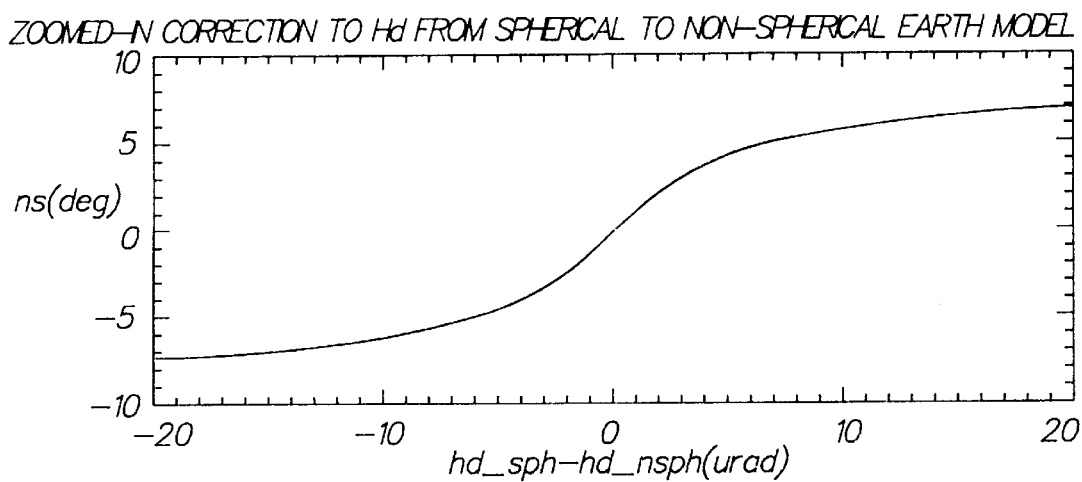

For attitude error in the order of 1000 μrad, numerical studies have shown that the correction term $\Delta H_s$ is under 1 μrad, but the correction term for $H_d$ can be quite large for high N/S scan angles. Even at mid-latitudes (N/S scan angle of 6°) where the Earth edge observations are used for the estimator, it could be as high as 20 μrad and should be corrected for. FIGS. 3A–3C illustrate the pseudo-observable differences for various N/S scan angles.

The Sequential Batch Estimator

The landmark and Earth edge measurement can be fitted to the observation models developed in the previous sections to determine the attitude coefficients via a least squares procedure. The attitude Fourier coefficients can be treated as a priori parameters whereas the polynomial coefficients should be freely determined. Thus, the problem of estimating the attitude coefficients based on landmark and Earth edge observations can be formulated as a hybrid sequential batch filter.

The a priori Fourier coefficients and their covariance matrix can initially be obtained by processing 24 hours of landmark and Earth edge data. Once this has been accomplished, navigation can then be performed on an image-by-image basis using the sequential batch algorithm.

For each half-frame of image data, the observed E/W and N/S scan angles are first corrected for the non-spherical Earth effect, using the current orbit and attitude knowledge. These modified observations are then fitted to the (spherical Earth-based) mathematical model using a sequential batch filter. The solve-for parameters are the Fourier and polynomial coefficients of the five attitude angles, and the a priori knowledge of these coefficients are determined as follows.

For a "normal image", i.e., no special events occurring immediately before this image, the a priori is the current solution and its full covariance matrix. For the images immediately following certain attitude disturbing "special events" such as momentum wheel unload, Earth sensor single-chord operation, or stationkeeping maneuvers, only the Fourier coefficients are treated as a priori information whereas the constant, ramp, and quadratic terms of each attitude angle are allowed to vary with much larger a priori errors. An "a priori retention factor" can be used to tune the relative importance of the a priori information with respect to the new data.

A summary of the sequential batch estimation algorithm is as follows.

For each iteration, we start with a nominal solution $x_0$. Let the attitude state be denoted by the vector of coefficients x, and that $\Gamma$ denotes its covariance matrix. The algorithm is an iterative one using a "differential corrections" approach. In general, several iterations are needed before a convergent solution can be established. The nominal solution for the first iteration may conveniently be set equal to the a priori solution, but that is not necessary-any initial estimate will suffice. The nominal solution for each successive iteration is determined from the previous iteration's corrected solution, whereas the a priori solution remains unchanged throughout the differential correction process.

The differential corrections to the nominal solution for each iteration is calculated via the following formula:

$$\delta x = (A^T W A + f_a \Lambda_a)^{-1} [A^T W \delta M + f_a \Lambda_a (x_a - x_0)] \qquad (89)$$

where x represents the solve-for parameters vector (all attitude coefficients),

δx is the differential correction to the solve-for parameters, $x_a$ is the vector of a priori solve-for parameters, $x_0$ is the vector of nominal solve-for parameters, A is the partials matrix of the observation vector with respect to the solve-for parameters, evaluated at the nominal solution, W is the data weight matrix, $f_a$ is an a priori tuning factor, (value 1 means a priori data receives full weight as current data), $\Lambda_a$ is the a priori information matrix (inverse of the a priori covariance matrix $\Gamma$), and δM is the vector of observation residuals.

The A Matrix can be computed analytically from the mathematical models of the respective observables developed previously, and by using the chain-rule for partial differentiation:

$$A_{mj} = \frac{\partial M_m}{\partial c_j} \qquad (90)$$

$$= \sum_{i=1}^{5} \frac{\partial M_m}{\partial \beta_i} \frac{\partial \beta_i}{\partial c_j}$$

where $M_m = M(\vec{\beta}(t_m))$ is the mth component of the observation vector, $t_m$ is the time of this observation, and $\beta(t_m)$ the attitude state vector evaluated at the observation time. The calculation of elements of the A matrix is described below.

The covariance matrix of the solution, for the current iteration, is given by $$\Gamma = (A^T W A + f_a \Lambda_a)^{-1} \qquad (91)$$

The corrected solution is then used as the nominal for the next iteration. The process is continued until convergence is established, or the solution is otherwise accepted or rejected by other criteria.

The solution may be deemed convergent if it meets any one of the following criteria:

Criterion 1: The percent change from the normalized rms residual to the predicted rms residual is smaller than a data-base-specified tolerance. The predicted residual is computed from the current iteration's solution by the following formula:

$$P^2 = N_m R^2 - [A^T W \delta M + f_a \Lambda_a (x_a - x_0)] \delta x \qquad (92)$$

where $N_m$ is the total number of measurements and R is the normalized rms residual based on the nominal solution.

Criterion 2: The percent change from the normalized rms residual to the previous iteration's normalized rms residual is smaller than a data-base-specified tolerance.

Criterion 3: All normalized rms residuals for each data type used (landmark E/W and N/S scan angles, Earth edge half-sum and half-difference pseudo-observables) are less than their data-base specified values.

In a manual mode of operation, and after convergence has been established, an analyst can decide whether or not to update the operational data base containing the current solution and the stored covariance matrix file. In automatic or batch mode, the update is automatic. If the maximum number of iterations has been reached without convergence, or if the analyst decides not to accept the solution, then the data base is not updated, and both the solution and the covariance matrix are written to temporary files for further analysis.

It has been found that the following combinations of spacecraft roll and pitch with the instrument misalignment parameters $$\phi_n = \phi + \phi_{ma}$$

$$\theta_n = \theta + \theta_{ma} \tag{93}$$

can reduce the high correlations between roll and roll misalignment, and between pitch and pitch misalignment solve-for parameters in the estimator. Thus, by formulating the estimator in terms of these modified roll and pitch parameters, higher accuracy in the determination of these parameters can be achieved. It should be noted that the modified parameters $\phi_n$, $\theta_n$ parameters can be interpreted as roll and pitch attitude referenced to the Imager instrument 10 nadir in contrast to the original $\phi$, $\theta$ which are referenced to the Earth's center.

Calculation of the A Matrix

To complete the mathematical formulation of the sequential batch estimator, the partial derivatives of the observables with respect to each of the solve-for parameters are needed. These partials form the elements of the Sensitivity Matrix (the "A Matrix") of the attitude estimation equations described above. According to Eq. (90), two kinds of partials are needed: the "observation partials" and the "state partials." Observation partials are partials of the observables (scan angles and Earth edges) with respect to the (attitude) state vector, and are considered below. State partials are partials of the state vector with respect to the solve-for parameters (the attitude coefficients), and are also considered below.

Landmark Observation Partials

The landmark observation partials are summarized below.
Partials of E with respect to roll, pitch, and yaw $$\frac{\partial E}{\partial \phi} = (\cos E)^{-1} \vec{M}_{\phi 1} \cdot \hat{s}_s \tag{94}$$

$$\frac{\partial E}{\partial \theta} = (\cos E)^{-1} \vec{M}_{\theta 1} \cdot \hat{s}_s$$

$$\frac{\partial E}{\partial \psi} = (\cos E)^{-1} \vec{M}_{\psi 1} \cdot \hat{s}_s$$

where the matrices $\vec{M}_{\phi 1}$, $\vec{M}_{\theta 1}$ and $\vec{M}_{\psi 1}$ are the first row vectors of the following matrices respectively:

$$M_{E\phi} = \frac{\partial M_E}{\partial \phi} = \begin{pmatrix} 0 & C_\phi S_\theta C_\psi - S_\psi S_\phi & S_\phi S_\theta S_\psi + S_\psi C_\phi \\ 0 & -C_\phi S_\theta S_\psi - C_\psi S_\phi & -S_\phi S_\theta S_\psi + C_\psi C_\phi \\ 0 & -C_\phi C_\theta & -S_\phi C_\theta \end{pmatrix} \tag{95}$$

$$M_{E\theta} = \begin{pmatrix} -S_\theta C_\psi & S_\phi C_\theta C_\psi & -C_\phi C_\theta C_\psi \\ S_\theta S_\psi & -S_\phi C_\theta S_\psi & C_\phi C_\theta S_\psi \\ C_\theta & S_\phi S_\theta & -C_\phi S_\theta \end{pmatrix} \tag{96}$$

$$M_{E\psi} = \begin{pmatrix} -C_\theta S_\psi & -S_\phi S_\theta S_\psi + C_\psi C_\phi & C_\phi S_\theta S_\psi + S_\phi C_\psi \\ -C_\theta C_\psi & -S_\phi S_\theta C_\psi - C_\phi S_\psi & C_\phi S_\theta C_\psi - S_\phi S_\psi \\ 0 & 0 & 0 \end{pmatrix} \tag{97}$$

Partials of N with respect to roll, pitch, and yaw $$\frac{\partial N}{\partial \phi} = \frac{1}{(\hat{m}_2 \cdot \hat{s}_s)^2 + (\hat{m}_3 \cdot \hat{s}_s)^2} \left[ (\hat{m}_2 \cdot \hat{s}_s)(\vec{M}_{\phi 3} \cdot \hat{s}_s) - (\hat{m}_3 \cdot \hat{s}_s)(\vec{M}_{\phi 2} \cdot \hat{s}_s) \right] \tag{98}$$

$$\frac{\partial N}{\partial \theta} = \frac{1}{(\hat{m}_2 \cdot \hat{s}_s)^2 + (\hat{m}_3 \cdot \hat{s}_s)^2} \left[ (\hat{m}_2 \cdot \hat{s}_s)(\vec{M}_{\theta 3} \cdot \hat{s}_s) - (\hat{m}_3 \cdot \hat{s}_s)(\vec{M}_{\theta 2} \cdot \hat{s}_s) \right] \tag{99}$$

$$\frac{\partial N}{\partial \psi} = \frac{1}{(\hat{m}_2 \cdot \hat{s}_s)^2 + (\hat{m}_3 \cdot \hat{s}_s)^2} \left[ (\hat{m}_2 \cdot \hat{s}_s)(\vec{M}_{\psi 3} \cdot \hat{s}_s) - (\hat{m}_3 \cdot \hat{s}_s)(\vec{M}_{\psi 2} \cdot \hat{s}_s) \right] \tag{100}$$

where the quantities $\vec{M}_{\phi 2}$, $\vec{M}_{\theta 2}$, and $\vec{M}_{\psi 2}$ represent the second row vector of the matrix $M_{E\phi}$, $M_{E\theta}$, and $M_{E\psi}$, and likewise the third row vectors of these matrices are denoted by the respective quantities with subscript 3.

Partials of E, N with respect to the misalignment angles

To complete the set of observation partials with respect to the orbit and attitude state vectors, the partials of the misalignment terms $\delta E_{ma}$, $\delta N_{ma}$ with respect to the misalignment angles are also required. These are:

$$\frac{\partial \delta E_{ma}}{\partial \phi_{ma}} = -S_N \tag{101}$$

$$\frac{\partial \delta E_{ma}}{\partial \theta_{ma}} = -C_N \tag{102}$$

$$\frac{\partial \delta N_{ma}}{\partial \phi_{ma}} = -\frac{\tilde{C}_N}{C_E} \tag{103}$$

$$\frac{\partial \delta N_{ma}}{\partial \theta_{ma}} = \frac{S_N}{C_E} \tag{104}$$

Earth Edge Observation Partials—Spherical Earth Model

The partials of the Earth edge observables $E_e$ and $E_w$, or of the pseudo-observables $H_s$ $H_d$, can be derived from differentiating Eqs. (34)–(37). This involves obtaining partials of the quantities $\xi$ and $\gamma$ defined in Eqs.(26)–(30).

To simplify notation, we shall break up the attitude state vector into two parts: $v=[\phi, \theta, \psi]$ and $\mu=[\phi_{ma}, \theta_{ma}]$. Thus, we can write $$\vec{\beta} = [v, \mu] \tag{105}$$

Also, for convenience, we define $$N' = N - \delta N_{ma} \tag{106}$$

Note that the Euler matrix elements $m_{ij}$ are functions of v only, and that N' is a function of $\mu$ only. The partials of N' with respect to attitude angles are given by:

$$\frac{\partial N'}{\partial v} = 0 \tag{107}$$

$$\frac{\partial N'}{\partial \mu} = -\frac{\partial \delta N_{ma}}{\partial \mu} \qquad (108)$$

and $\partial \delta N_{ma}/\partial \mu$ are obtained from Eqs.(57) and (58).

Based on the foregoing, the following expressions have been derived for the partials of $\xi$ with respect to attitude:

$$\frac{\partial \zeta}{\partial v} = \frac{1}{DC_\zeta}\left[\frac{\partial m_{13}}{\partial v} - S_\zeta \frac{\partial D}{\partial v}\right] \qquad (109)$$

$$\frac{\partial \zeta}{\partial \mu} = \frac{T_\zeta}{D}\frac{\partial D}{\partial \mu} \qquad (110)$$

where the partials of $m_{,,}$ with respect to v are given by:

$$\frac{\partial m_{13}}{\partial v} = [S_\phi S_\theta C_\psi + C_\phi S_\psi, -C_\phi C_\theta C_\psi, C_\phi S_\theta S_\psi + S_\phi C_\psi] \qquad (111)$$

$$\frac{\partial m_{23}}{\partial v} = [-S_\phi S_\theta S_\psi + C_\phi C_\psi, C_\phi C_\theta S_\psi, C_\phi S_\theta C_\psi - S_\phi S_\psi] \qquad (112)$$

$$\frac{\partial m_{33}}{\partial v} = [-S_\phi C_\theta, -C_\phi S_\theta, 0] \qquad (113)$$

and the partials of D with respect to attitude are given by $$\frac{\partial D}{\partial v} = C_\zeta\left(C_{N'}\frac{\partial m_{33}}{\partial v} - S_{N'}\frac{\partial m_{23}}{\partial v}\right) + S_\zeta\frac{\partial m_{13}}{\partial v} \qquad (114)$$

$$\frac{\partial D}{\partial \mu} = -C_\zeta(S_{N'}m_{33} + C_{N'}m_{23})\frac{\partial N'}{\partial \mu} \qquad (115)$$

The partials of y with respect to the attitude state vector are calculated in a similar fashion and summarized below:

$$\frac{\partial \gamma}{\partial v} = \frac{1}{DT_\gamma}\frac{\partial D}{\partial v} \qquad (116)$$

$$\frac{\partial \gamma}{\partial \mu} = \frac{1}{DT_\gamma}\frac{\partial D}{\partial \mu} \qquad (117)$$

Finally, the partials of the half-sum and half-difference pseudo-observables with respect to the attitude state vector can be expressed in terms of partials already derived:

$$\frac{\partial H_s}{\partial \beta} = \begin{pmatrix} \frac{\partial \zeta}{\partial v} \\ \frac{\partial \zeta}{\partial \mu} + \frac{\partial \delta E_{ma}}{\partial \mu} \end{pmatrix} \qquad (118)$$

$$\frac{\partial H_d}{\partial \beta} = \begin{pmatrix} \frac{\partial \gamma}{\partial v} \\ \frac{\partial \gamma}{\partial \mu} \end{pmatrix} \qquad (119)$$

State partials

Partials of the attitude state vector, $\beta$, with respect to the Fourier and polynomial attitude coefficients can be easily written down by inspecting the attitude model equation, Eq.(1) given above. The results are $$\frac{\partial \beta^i}{\partial c_n^j} = \delta_{ij}\cos n\omega t, n = 1, 2, \ldots, n_f \qquad (120)$$

$$\frac{\partial \beta^i}{\partial s_n^j} = \delta_{ij}\sin n\omega t, n = 1, 2, \ldots, n_f \qquad (121)$$

$$\frac{\partial \beta^i}{\partial a_k^j} = \delta_{ij}\sin(\omega t)^k, k = 0, 1, \ldots, n_p \qquad (122)$$

where i, j index the ith or jth attitude angle.

Special Events Considerations

Special events are events that can potentially disturb the attitude of the spacecraft to a large extent so as to invalidate the use of the existing (previous frame's) solution as a priori knowledge. Some of the special events considered are:

Yaw unload

Pitch unload

Stationkeeping

Trimtab/Solar Array adjustment

Scan inhibit

Eclipse

Manual thruster firing

Earth Sensor Single-Chord Operation

When a special event is detected (by monitoring a Special Events Log), one or two half-frames of image data following that event are not used for attitude determination. (Two half-frames of data for N/S stationkeeping events.) Through control system simulations, it has been found that the attitude disturbance after a special event manifests as a rapid change in the constant levels in roll, pitch, and yaw, but very little change in the Fourier components or in misalignment angles. Hence, upon exit from a special event and before processing the next half-frame of data, the a priori covariance matrix is modified according to the following rule.

Rule: Increase the a priori standard deviations of the constant terms in roll, pitch, and yaw to some predetermined number of microradians. This means replacing the diagonal elements of the a priori covariance matrix corresponding to these terms with the value e.g., $10^{-6}$ (radians)$^2$. In addition, zero out all cross terms between these constants and the other terms. If there is reason to believe that different magnitudes of attitude changes are involved for the specific event, then the a priori sigmas should be adjusted accordingly. The Fourier portion of the a priori covariance matrix for all angles as well as the coefficients for the misalignment angles should remain unchanged.

The Navigation Processor 14

The Navigation Processor 14 is the component of the Ground Processing System that performs the following functions:

- inputting of landmark and Earth edge data produced by the Image Processor 12;
- determination of the spacecraft position and velocity at timetags corresponding to the landmark and Earth edge data by interpolation of the ephemeris provided by the Orbit Determination function 20;
- initiation of attitude determination at scheduled times in accordance with the observation scenario; and
- delivery of the attitude solution to users 18 according to a delivery schedule, and to the Image Processor 12 for image distortion correction by pixel manipulation.

The architecture of the Navigation Processor 14 can be described in terms of its three hierarchical components: Input, Process, and Output. The equations developed in the previous sections are transformed into a data processing algorithm (The Navigation Algorithm 14A) as the "Process" component of the Navigation Processor 14. The Input and Output components are described in the following sections.

Input Specification

Figure 4:
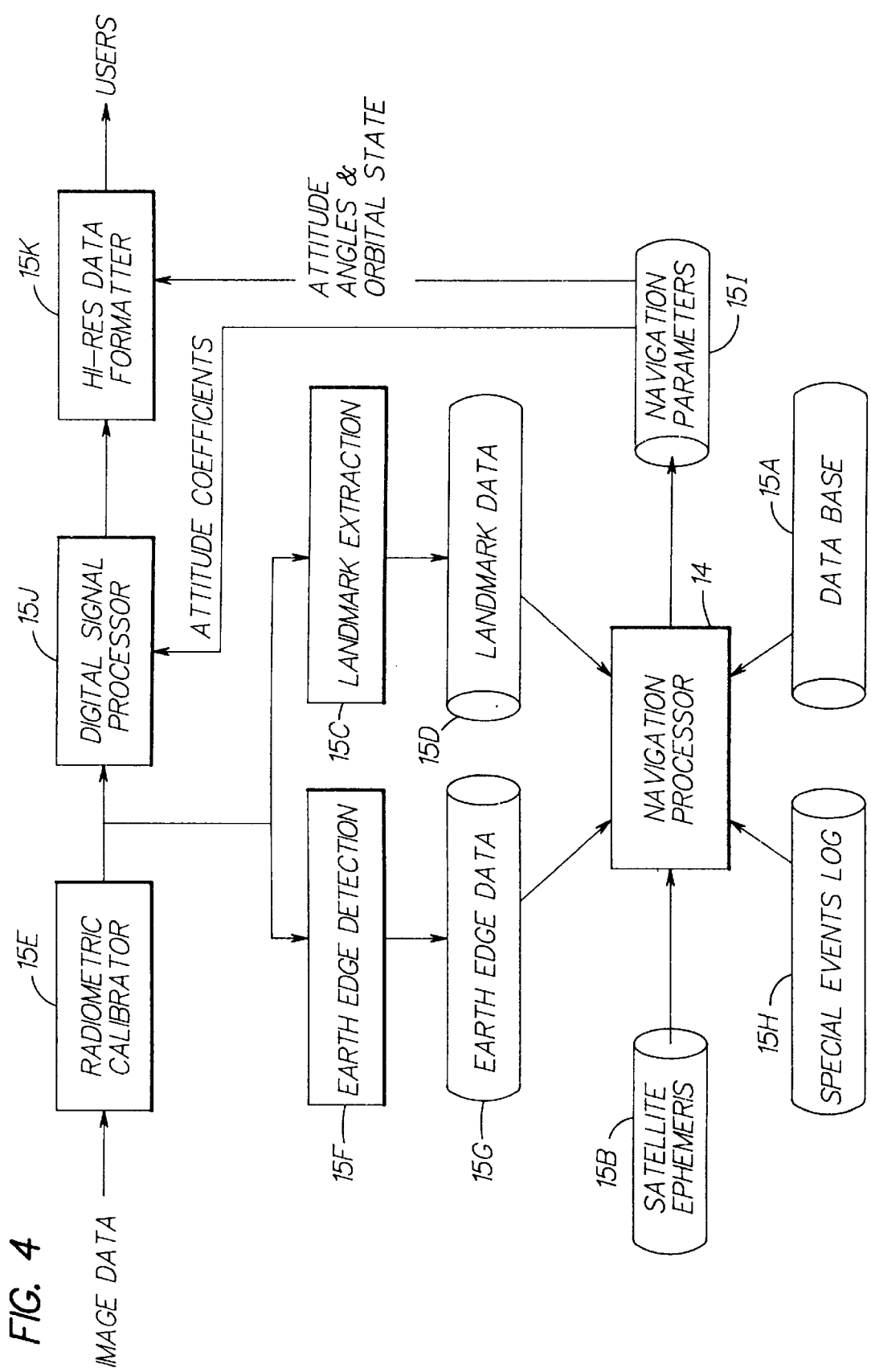
FIG. 4 is a block diagram of an input/output (I/O) interface for the Navigation Processor of FIG. 1.

This section describes the input items required by the Navigation Processor 14. A schematic block diagram of the external interface connecting the Navigation Processor 14 with data provided by various other subsystems is shown in FIG. 4.

Data Base 15A Input

The Navigation Processor 14 requires certain frequently used parameters to be resident in memory for efficient processing. These include the mathematical constants $\pi$, degree to radian conversion factor $180/\pi$, and e, base of natural logarithm. The data base 15A also includes physical constants such as the Earth's equatorial radius (km), the Earth's polar radius (km), the Earth's Sidereal rate (rad/sec), the ideal geosynchronous radius (km), the maximum E/W scan angle allowed (degrees), and the maximum N/S scan angle allowed (degrees). The data base 15A also stores a Landmark Data Base comprised of landmark ID (integer), longitude (degrees East), geodetic latitude (degrees North), and the height above the WGS-84 ellipsoid (km).

File Input

The file input is satellite ephemeris data 15B. The satellite ephemeris (time history of position and velocity) is periodically generated by the Orbit Determination computer 20. The ephemeris data is preferably in the form of a file containing time-ordered records of the Cartesian position and velocity components in the True-of-Date coordinates that can be accurately interpolated by the Navigation Processor 14 for any time point within the span of interest.

The coordinate frame for all calculations used within the Navigation Processor 14 is preferably the True Equator and True Equinox of Date (True-of-Date) frame. The transformation from the Mean Equator and Mean Equinox of J2000.0 to the True-of-Date reference, which involves precision, nutation, polar motion, and UT1-UTC corrections, is performed external to the Navigation Processor 14. In this way, the Earth's instantaneous orientation is simply specified by the value of the Greenwich Right Ascension.

Landmark Observations

Landmark observations 15D are provided by the landmark extraction function 15C operating on Imager data processed by a radiometric calibrator 15E that forms a portion of the image processor 12 of FIG. 1. At each 15 minute mark, a file containing blocks of time-tagged records of landmark observations are made available by the Image Processor 12 for reading by the Navigation Processor 14. Information in this file includes at least: time-tag (seconds from UTC Midnight); landmark ID (integer); E/W scan angle measurement (radians); E/W scan angle measurement noise (microradians); N/S scan angle measurement (radians); and N/S scan angle measurement noise (microradians).

Earth Edge Observations

Earth edge observations 15G are provided by the Earth edge detection function 15F, which also operates on Imager data processed by the radiometric calibrator 15E. At the same 15-minute mark as for landmark observations, a file containing blocks of Earth edge measurements are provided by the Image Processor 12. This file contains at least the following information: time-tag (seconds from UTC midnight); a specified number of sets of Earth edge scan angle pairs (E, N) at 0.1 deg N/S scan angle separations centered at 45N or 45S latitude; n sets (e.g., 10 sets) of Earth edge scan angle pairs (E, N) at 0.1 deg N/S scan angle separations centered at the equator; and noise on the Earth edge measurements.

It should be noted that other Earth edge observation strategies may be used, such as different combinations of numbers of measurements and separations at different latitudes. The Navigation Processor 14 need not know how the Earth edge observations are obtained.

Special Events Log 15H

As was described, the occurrence of special events will influence the attitude of the spacecraft 2, and the Navigation Processor 14 needs to know when these events occur so as to make adjustments in the inputs to the Navigation Algorithm 14A. It is preferred that a log of the time and type of event be maintained based upon information returned from other subsystems. These events are stored in the special events log 15H.

It is noted that for the operational software, landmark and Earth edge observations may be merged and sent to the Navigation Processor 14 asynchronously by the Image Processor 12; i.e., they may be sent as external messages whenever a half-frame image solution has been completed. It is then the responsibility of the Navigation Processor 14 to extract the proper landmark and Earth edge observations from the merged external messages.

Output Specification

Upon processing the input data, the Navigation Processor 14 generates the following output information. The first type of information is referred to as a data base update, and includes the current attitude coefficients (updated at the end of every solution), and the navigation parameters 15I (attitude and misalignment angles whose values are stored in a table time-tagged at a data base-specified frequency).

The second type of information is a file output that includes, by example, performance reports such as data or plot files of the attitude profile and the observation residuals after each iteration, generated automatically at the end of every solution session, and navigation parameters, which may be an ASCII image of the corresponding data base.

External Message Output

At regular intervals, the Navigation Processor 14 delivers documentation of the orbit and attitude parameters to the users. The documentation contains the five attitude angles and the six orbital elements. At the end of every half-frame, the Navigation Processor 14 also delivers the updated set of attitude coefficients to the Image Processor 12 (the DSP 15J) for image distortion correction.

That is, the navigation parameters 15I are periodically provided to the digital signal processor (DSP) 15J, specifically the attitude coefficients, and to a high resolution formatter 15K, specifically attitude angles and orbital state. The end result is the output of accurate processed Earth image data to the end user computers 18, as shown in FIG. 1, via the product transmit unit 16 and the reformatted data uplink to the spacecraft 2.

While the invention has been particularly shown and described with respect to a preferred embodiment thereof, it will be understood by those skilled in the art that changes in form and details may be made therein without departing from the scope and spirit of the invention.

What is claimed is:

1. A method for imaging a celestial object with a spacecraft orbiting the celestial object, comprising steps of:

operating an imager instrument aboard the spacecraft to generate data representing an image of the celestial object;

processing the image data to derive a location of at least one predetermined landmark in the image and a location of edges of the celestial object in the image; and further processing the detected locations to obtain an attitude of the imager instrument.

2. A method as in claim 1, and further comprising the step of outputting the image and the imager instrument attitude to at least one end-user of the image.

3. A method as in claim 1, and further comprising the step of using the imager instrument attitude to revise the image before outputting the image to at least one end-user of the image.

4. A method as in claim 1, wherein the generated data represents a one half frame image, and wherein the steps of processing and further processing occur at a one half frame rate.

5. A method as in claim 1, wherein the step of processing includes a step of inputting imager instrument scan angles.

6. A method as in claim 1, wherein the step of processing the image data to derive a location of edges of the celestial object in the image operates in accordance with a spherical Earth model, and further comprising a step of applying correction terms to accommodate a non-spherical Earth model.

7. A method as in claim 1, wherein the step of processing the image data to derive a location of edges of the celestial object in the image includes an initial step of obtaining Earth edge observables by measuring imager instrument line-of-sight (LOS) scan angles during an East-West scan when the LOS enters and exits the Earth's horizon.

8. A method as in claim 7, wherein the Earth edge observables are combined to form half-sum and half-difference pseudo observables, wherein the half-sum pseudo-observable ($H_s$) can be interpreted as an E/W coordinate of a mid-point of a line joining two measured Earth edges corresponding to a given North-South imager instrument scan line, and wherein the half-difference pseudo-observable ($H_d$) can be interpreted as a deviation of a half-chord length of the line joining the two measured Earth edges from a nominal value.

9. A method as in claim 1, wherein correlation between the parameters specifying a misalignment of an image optical axis and spacecraft axes are reduced by combining them in a predetermined manner.

10. A method as in claim 1, wherein landmark and celestial body edge measurements are fitted to an observational model to determine attitude coefficients using a sequential batch least squares procedure.

11. A method as in claim 10, wherein the step of fitting includes steps of, for each half-frame of image data:

correcting observed East-West and North-South scan angles in accordance with a non-spherical Earth model, using current orbit and attitude knowledge, to provide modelled observations; and fitting the modified observations to a spherical Earth-based mathematical model using a sequential batch filter; wherein parameters that are solved are Fourier and polynomial coefficients of five attitude angles defined as three angles representing the attitude state of the spacecraft characterized by Euler angles roll ($\phi$), pitch ($\theta$), and yaw ($\psi$), and the attitude state of the imager instrument, relative to the spacecraft body, described by a misalignment of the imager instrument optical axis with respect to the spacecraft body axes, expressed as two angles representing roll misalignment ($\phi_{ma}$) and pitch misalignment ($\theta_{ma}$)).

12. A method as in claim 11, wherein a priori knowledge of the coefficients are used to determine, for the case where no special event occurs immediately before the image, the current attitude solution and its full covariance matrix; and wherein a priori knowledge of the Fourier coefficients are used for the case where a special event does occur before the image.

13. A method for imaging a celestial object with a spacecraft orbiting the celestial object, comprising steps of:

operating an imager instrument aboard the spacecraft to generate scan-line data representing an image of the celestial object;

processing the scan-line data to derive a location of at least one predetermined landmark in the image and a location, along at least two scan-lines, of edges of the celestial object in the image; and further processing the detected locations to obtain an attitude of the imager instrument.

14. A method as in claim 13, wherein the at least two scan-lines correspond to two lines of latitude of the celestial object.

15. A method as in claim 14, wherein the two lines of latitude are about 45 degrees North latitude and about 45 degrees South latitude.

16. A method as in claim 13, and further comprising the step of outputting at least the image and the imager instrument attitude to at least one end-user of the image.

17. A method as in claim 16, and further comprising the step of using the imager instrument attitude to revise the image before outputting the image to the least one end-user of the image.

18. A method as in claim 13, wherein the scan-line data represents a one half frame image, and wherein the steps of processing and further processing occur at a one half frame rate.

19. A method as in claim 13, wherein the step of processing includes a step of inputting imager instrument scan angles.

20. A method as in claim 13, wherein the step of processing the image data to derive a location of edges of the celestial object in the image operates in accordance with a spherical Earth model, and further comprising a step of applying correction terms to accommodate a non-spherical Earth model.

21. A method as in claim 13, wherein the step of processing the image data to derive a location of edges of the celestial object in the image includes an initial step of obtaining Earth edge observables by measuring imager instrument line-of-sight (LOS) scan angles during an East-West scan when the LOS enters and exits the Earth's horizon.

22. A method as in claim 21, wherein the Earth edge observables are combined to form half-sum and half-difference pseudo observables, wherein the half-sum pseudo-observable ($H_s$) are interpreted as an E/W coordinate of a mid-point of a line joining two measured Earth edges corresponding to a given North-South imager instrument scan line, and wherein the half-difference pseudo-observable ($H_d$) can be interpreted as a deviation from a nominal value of a half-chord length of the line joining the two measured Earth edges.

23. A method as in claim 13, wherein correlation between the parameters specifying a misalignment of the image optical axis and spacecraft roll and pitch axes are reduced by combining them in a predetermined manner.

24. A method as in claim 13, wherein landmark and cellestial body edge measurements are fitted to an observational model to determine attitude coefficients using a sequential batch least squares procedure.

25. A method as in claim 24, wherein the step of fitting includes steps of, for each half-frame of image data:

correcting observed East-West and North-South scan angles in accordance with a non-spherical Earth model, using current orbit and attitude knowledge, to provide modelled observations; and fitting the modified observations to a spherical Earth-based mathematical model using a sequential batch filter; wherein parameters that are solved are Fourier and polynomial coefficients of five attitude angles defined as three angles representing the attitude state of the spacecraft characterized by Euler angles roll ($\phi$), pitch ($\theta$), and yaw ($\psi$), and the attitude state of the imager instrument, relative to the spacecraft body, described by a misalignment of the imager instrument optical axis with respect to the spacecraft body axes, expressed as two angles representing roll misalignment ($\phi_{ma}$) and pitch misalignment ($\theta_{ma}$).

26. A method as in claim 25, wherein a priori knowledge of the coefficients are used to determine, for the case where no special event occurs immediately before the image, the current attitude solution and its full covariance matrix; and wherein a priori knowledge of the Fourier coefficients are used for the case where a special event does occur before the image.

27. An observation system for obtaining an image of the Earth, comprising:

a spacecraft orbiting the Earth, said spacecraft comprising an imager instrument having a camera for obtaining an image of the Earth; and a terrestrial data processor system linked to said spacecraft through a first communication link for receiving said obtained image and for processing said obtained image to derive a location of at least one predetermined landmark in the image and a location, along at least two image scan-lines, of edges of the Earth in the image, and further processing the detected locations to obtain an attitude of at least said imager instrument, said observation system further comprising means for providing at least the image to at least one end-user of the image.

28. A system as in claim 27, wherein said providing means further provides the imager instrument attitude to the at least one end-user.

29. A system as in claim 27, wherein said data processor system employs said obtained imager instrument attitude to revise said image before outputting said image to the least one end-user.

30. A system as in claim 27, wherein said providing means is coupled to said at least one end-user through a second communication link, said second communication link comprising said spacecraft.

* * * * *